United States Patent
Horiuchi et al.

(10) Patent No.: US 7,834,946 B2
(45) Date of Patent: Nov. 16, 2010

(54) DISPLAY DEVICE AND COLOR FILTER SUBSTRATE

(75) Inventors: Satoshi Horiuchi, Taki-gun (JP); Yuhko Hisada, Matsusaka (JP); Ryohki Itoh, Taki-gun (JP); Takaharu Yamada, Tsu (JP)

(73) Assignee: Sharp Kabushiki Kaisha, Osaka (JP)

( * ) Notice: Subject to any disclaimer, the term of this patent is extended or adjusted under 35 U.S.C. 154(b) by 255 days.

(21) Appl. No.: 12/295,048

(22) PCT Filed: Mar. 20, 2007

(86) PCT No.: PCT/JP2007/055698

§ 371 (c)(1),
(2), (4) Date: Sep. 29, 2008

(87) PCT Pub. No.: WO2007/119454

PCT Pub. Date: Oct. 25, 2007

(65) Prior Publication Data

US 2009/0290080 A1 Nov. 26, 2009

(30) Foreign Application Priority Data

Mar. 30, 2006 (JP) .............................. 2006-095960

(51) Int. Cl.
*G02F 1/1343* (2006.01)
*G02F 1/1333* (2006.01)

(52) U.S. Cl. ........................................ 349/38; 349/110

(58) Field of Classification Search .................. 349/33, 349/37, 38, 41, 110

See application file for complete search history.

(56) References Cited

U.S. PATENT DOCUMENTS

| 6,466,285 | B1 | 10/2002 | Ichikawa |
| 7,388,630 | B2 | 6/2008 | Shin et al. |
| 2002/0003588 | A1 | 1/2002 | Okada et al. |
| 2004/0017521 | A1 | 1/2004 | Okada et al. |

(Continued)

FOREIGN PATENT DOCUMENTS

JP 05-080353 A 4/1993

(Continued)

OTHER PUBLICATIONS

Official Communication issued in International Patent Application No. PCT/JP2007/055698, mailed on Jun. 26, 2007.

(Continued)

*Primary Examiner*—Rhonda S Peace
(74) *Attorney, Agent, or Firm*—Keating & Bennett, LLP

(57) ABSTRACT

A display device includes multiple signal lines that are connected to multiple pixel electrodes including first and second pixel electrodes. The distance between one end of the first pixel electrode and the centerline of a first signal line is greater than the distance between one end of the second pixel electrode and the centerline of a second signal line. Alternatively, the distance between the other end of the first pixel electrode and the centerline of an adjacent signal line, which is located on the opposite side of the first pixel electrode from the first signal line, is greater than the distance between the other end of the second pixel electrode and the centerline of another adjacent signal line, which is located on the opposite side of the second pixel electrode from the second signal line.

53 Claims, 15 Drawing Sheets

U.S. PATENT DOCUMENTS

| | | |
|---|---|---|
| 2004/0108978 A1 | 6/2004 | Matsueda et al. |
| 2005/0068281 A1 | 3/2005 | Shin et al. |
| 2009/0040243 A1 | 2/2009 | Hisada et al. |

FOREIGN PATENT DOCUMENTS

| | | |
|---|---|---|
| JP | 2001-184012 A | 7/2001 |
| JP | 2005-243281 A | 9/2005 |

OTHER PUBLICATIONS

English translation of the official communication in the counterpart international Application No. PCT/JP2007/055698, mailed on Oct. 30, 2008.

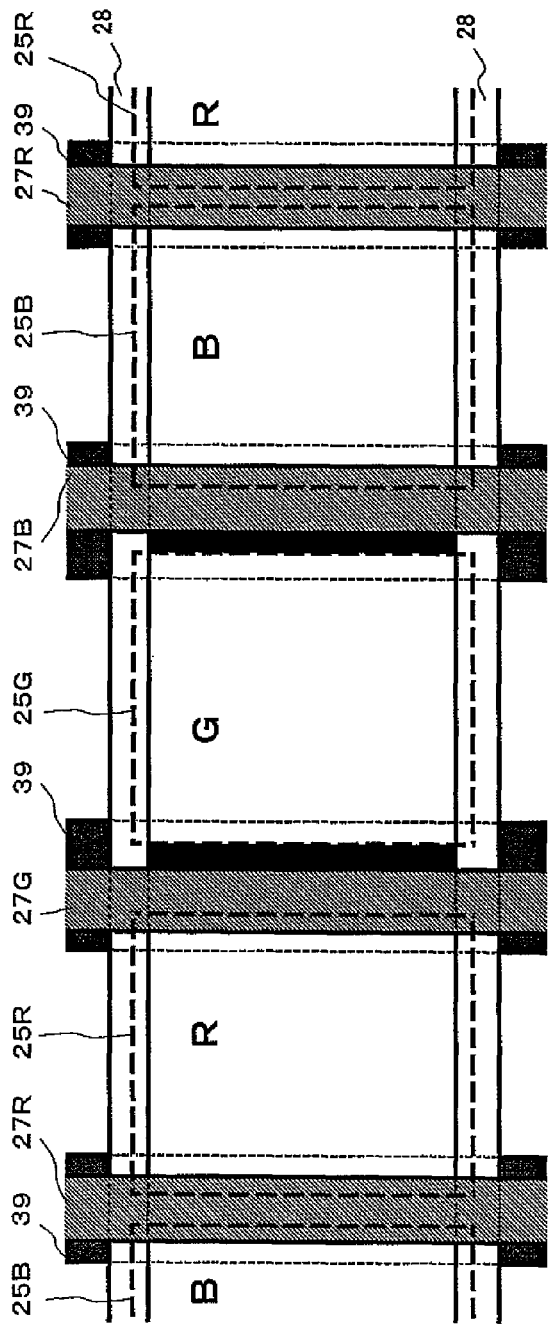
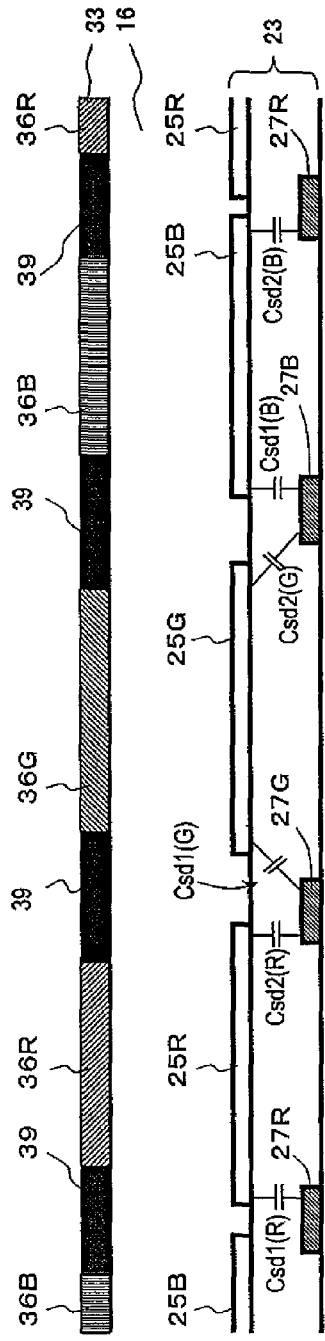
FIG. 3A
FIG. 3B

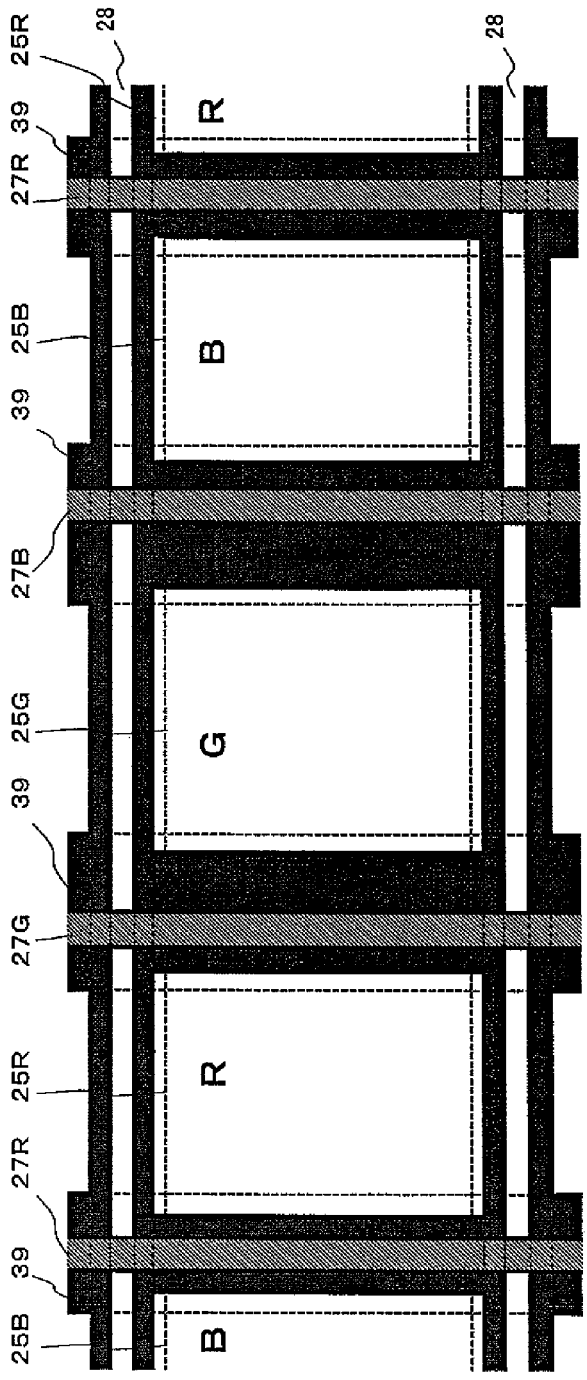
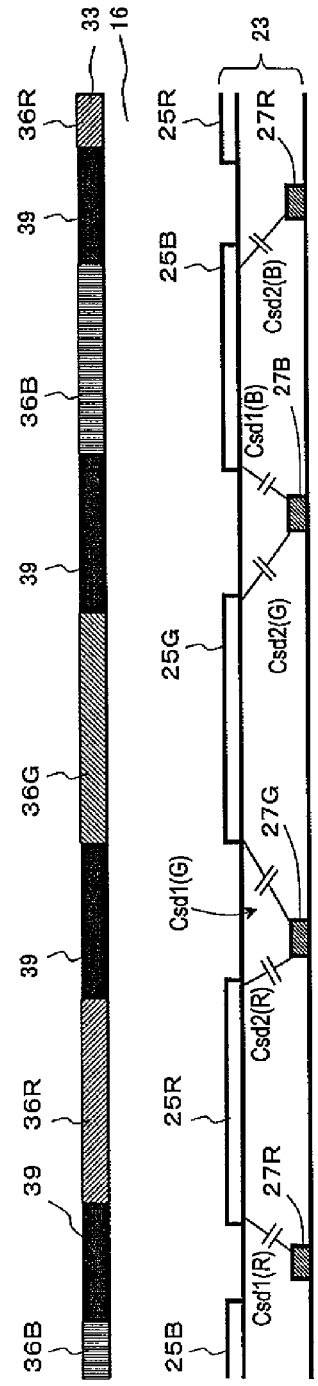
FIG. 5A
FIG. 5B

DISPLAY DEVICE AND COLOR FILTER SUBSTRATE

BACKGROUND OF THE INVENTION

1. Field of the Invention

The present invention relates to a display device and more particularly relates to a display device that conducts a display operation using a display area including at least more than one pixel.

2. Description of the Related Art

A color display device such as a color TV monitor or a color display monitor represents colors usually by adding together the three primary colors of RGB, namely, red (R), green (G) and blue (b). Thus, each display unit of a color display device (which will be referred to herein as a "color display pixel") has red, green and blue pixels for these three primary colors of RGB. By controlling the luminances of these red, green and blue pixels into desired values, a variety of colors can be represented.

The luminances of the respective pixels vary within the range from the one corresponding to their lowest grayscale (e.g., grayscale #0) through the one corresponding to their highest grayscale (e.g., grayscale #255). The luminance of the pixels corresponding to their lowest grayscale will be represented herein by 0.0, while that of the pixels corresponding to their highest one will be represented herein by 1.0 for convenience sake. The relation between the pixels' grayscales and luminances may be represented by a gamma curve with $\gamma=2.2$, for example.

If in a certain display unit, all of its pixels, namely, the red, green and blue pixels, have a luminance of 0.0, the color represented by that display unit is black. Conversely, if all of those pixels have a luminance of 1.0, the color represented by that pixel is white.

Besides such display devices that use the three primary colors of RGB, display devices that conduct a display operation using four or more colors have also been proposed to increase the luminances and to expand the color representation range (see Japanese Patent Application Laid-Open Publication No. 2005-62869, for example). The display device disclosed in that document is a liquid crystal display device that performs a color display operation in not just red, green and blue but also white.

Recently, various types of thin color display devices such as liquid crystal displays and organic EL displays have been developed rapidly. In those display devices, pixels are driven by a simple-matrix addressing or active-matrix addressing method. To ensure even higher quality in conducting a color display operation, the active-matrix addressing method, which will achieve a higher contrast with the residual image reduced, is preferably adopted.

FIG. 13 is a plan view illustrating a part of the active-matrix substrate of an active-matrix-addressed color display device as viewed perpendicularly to the substrate. In this example, the color display device is an active-matrix-addressed liquid crystal display (LCD). This LCD adopts a normally white mode (that makes a white display when no voltage is applied to its liquid crystal layer) as its mode of operation.

As shown in FIG. 13, in this LCD 100, scan lines (gate lines) 102 and signal lines (data lines) 104 are arranged so as to intersect with each other on a TFT (thin-film transistor) substrate 101, and a pixel electrode 106 is arranged in each of multiple regions surrounded by the scan lines 102 and signal lines 104. Each of those pixel electrodes 106 is provided for its associated pixel 108. And a number of those pixels 108 that are arranged to define a matrix pattern form the display area of the LCD. In this description, a region surrounded with the respective centerlines of two adjacent scan lines and those of two adjacent signal lines will be referred to herein as a "pixel".

FIG. 14 illustrates a configuration for an arbitrary pixel 108A in the display area. Over the active-matrix substrate 101, arranged is a color filter substrate 116 including a counter electrode 112 and color filters 114. A liquid crystal layer 110 is interposed between these two substrates 101 and 116. In each pixel, the orientations of liquid crystal molecules are controlled based on the potential difference between the pixel electrode 106A of the pixel 108A and the counter electrode 112, thus varying the optical transmittance of that pixel and conducting a color display operation. The color filter substrate 116 further includes a black matrix (BM) 118 to cut off the light that is going to leak. The BM has an aperture 119A over the pixel electrode 106A. The light transmitting area of the pixel 108A is obtained by subtracting the sum of the opaque areas, defined by the lines on the TFT substrate, from the area of the aperture 119A.

A TFT 120A is provided as a switching element for the pixel 108A. The TFT 120A has its gate 122A, source 124A and drain 126A electrically connected to the scan line 102, the signal line 104A and the pixel electrode 106A, respectively. As shown in FIG. 14, in the next pixel 108B located on the right-hand side of, and on the same row as, the pixel 108A to form the next stage, the TFT 120B has its gate 122B, source 124B and drain 126B electrically connected to the scan line 102A, the signal line 104B and the pixel electrode 106B, respectively.

In an LCD that conducts a color display operation using the three primary colors of RGB, each set of red, green and blue pixels are arranged continuously along a gate line, for example, to form a single display unit. On the other hand, in an LCD that conducts a color display operation using the four colors of RGBW, each set of red, green, blue and white pixels are arranged continuously along a gate line, for example, to form a single display unit.

A parasitic capacitor Csd1 is formed between the signal line 104A connected to the source 124A of the TFT 120A and the pixel electrode 106A. Meanwhile, another parasitic capacitor Csd2 is formed between the signal line 104B connected to the pixel electrode 106B of the pixel 108B, which is located next to the pixel 108A, and the pixel electrode 106A.

In presenting an image on the LCD 100, a scan signal and a display signal are supplied to the scan lines 102 and the signal lines 104 by a line inversion drive technique, for example. The display signal is supplied by a frame inversion drive technique, by which the polarity inverts one frame after another.

FIG. 15 shows how the display signal inverts its polarity according to the line inversion drive technique. As shown in FIG. 15, within one frame, positive and negative voltages are alternately applied to the pixel electrodes on one row of pixels after another. That is to say, if a positive voltage has been applied to each pixel electrode on a certain row of pixels, then a negative voltage is applied to each pixel electrode (on the next stage) on the next row of pixels.

FIG. 16 shows the waveform of a voltage (i.e., TFT's drain potential) applied to a pixel electrode (e.g., the pixel electrode 106A shown in FIG. 14) in a situation where the line inversion drive technique is adopted. As shown in FIG. 16, when a gate potential Vg is applied to the TFT 120A of the pixel 108A, its gate 122A is turned ON. As a result, the source 124A and the drain 126A of the TFT 120A gets electrically continuous, thus raising the drain potential Vd to the vicinity of a source potential Vs. When the gate 122A is turned OFF after that, the drain potential Vd to maintain decreases by a feedthrough voltage ΔVd. In this case, the feedthrough voltage ΔVd is calculated by the following equation:

$$\Delta Vd = Cgd/(Cgd+Clc+Ccs+Csd) \times Vgpp$$

where Cgd is gate-drain capacitance, Clc is liquid crystal capacitance, Ccs is storage capacitance and Vgpp is the difference between the maximum and minimum values of the gate voltage.

Thereafter, the drain potential Vd is affected by the parasitic capacitors Csd1 and Csd2 to further change by ΔVsd, which is given by the following equation:

$$\Delta Vsd = Csd/(Cgd+Clc+Ccs+Csd) \times \Delta Vs$$

where ΔVs is a variation in signal voltage.

When a display operation is performed by the line inversion drive, potentials of the same polarity are applied to the pixel electrodes 106A and 106B, and therefore, the parasitic capacitances Csd1 and Csd2 do not cancel each other but both cause a variation in the drain potential Vd. Particularly if a display operation is performed in upper and lower portions of the display area over and under the pixel 108A at higher grayscales than in the pixel 108A, then the drain potential Vd comes to have an increased effective value during one frame (F) of the image in the pixel electrode 106A of the pixel 108A. As a result, a so-called "shadowing phenomenon" occurs on the monitor screen.

FIG. 17 illustrates how shadowing occurs in a normally white mode. Specifically, FIG. 17 illustrates a monitor screen on which a black rectangle (region A) is presented at the center of the display area of the LCD 100. Regions B are the upper and lower portions of the display area that are located over and under the region A. It should be noted that in FIG. 15, the vertical direction on the paper corresponds to the vertical direction on the screen. In these regions B, the image should be presented in a lighter color (e.g., in light gray) than in the region A and the color should be as light as in the other regions C that are located on the right- and left-hand sides of the region A. However, for the reasons described above, the drain potential Vd of the pixels has an increased effective value in the regions B. As a result, the grayscale decreases in the regions B and the image presented in the regions B becomes as if the shadow of the black rectangle presented in the region A were cast in the region B.

The LCD described above is supposed to operate in a normally white mode. However, if the LCD adopted a normally black mode (that performs a black display when no voltages are applied), then the regions located over and under a white display region would have an increased grayscale for the same reasons as the ones described above, thus causing a shadowing phenomenon, too. Generally speaking, according to the line inversion drive technique, such shadowing inevitably happens. Still and all, as the power dissipation could be cut down by supplying an appropriate signal to the scan lines, the line drive inversion is applied to the fields of cell phones and PDAs.

Meanwhile, to eliminate such shadowing, a dot inversion drive technique could be adopted instead of the line inversion drive technique. FIG. 18 illustrates how to perform the dot inversion drive. As shown in FIG. 18, according to the dot inversion drive technique, signal potentials of opposite polarities are supplied to each pair of pixels that are adjacent to each other in the row direction or in the column direction. As a result, the influences of the parasitic capacitances Csd1 and Csd2 on the drain potential will cancel each other and the shadowing phenomenon will rarely happen. That is why the dot inversion drive technique is used extensively in the fields of laptops and TV sets in which the display quality should be given a top priority.

Nevertheless, even if the dot inversion drive technique is adopted, a so-called "interblock variation" will still happen. Specifically, in manufacturing active-matrix substrates for LCDs, TFTs, electrodes, signal lines and other members are fabricated on a glass substrate by multilayer technologies. In the manufacturing process of such active-matrix substrates, sometimes not all of those interconnect patterns are formed over the entire surface of the single glass substrate but some interconnect patterns may be formed on a block-by-block basis by dividing the surface of the glass substrate into a number of blocks and performing a stepper exposure process on one of those blocks after another. In that case, misalignment could occur between the signal lines and the pixel electrodes and the distance between the signal line and the pixel electrode could vary from one block to another on any of the active-matrix substrates completed that way.

And if an LCD were fabricated on such a substrate, then the potentials at the pixel electrodes of multiple pixels that should display the same color could be different from each other between a block with such misalignment and a block with no misalignment or between two blocks with misalignment. As a result, the colors displayed on the monitor screen would have noticeably different grayscales from one block to another, thus causing the "interblock variation" phenomenon. That interblock variation will occur not only in such a display device of the dot inversion drive type but also in a display device of the line inversion drive type. The interblock variation could also be caused due to some local difference in the degree of perfection during the manufacturing process steps of the display device.

To avoid such shadowing or interblock variation, it would be effective to reduce the variation ΔCsd in the parasitic capacitance Csd due to the presence of the parasitic capacitors, misalignment or the local difference in the degree of perfection. If the parasitic capacitance Csd was reduced, however, then the power dissipation would often increase due to a decrease in aperture ratio (or transmittance), a decrease in yield or an increase in the capacitance of signal lines.

SUMMARY OF THE INVENTION

In order to overcome the problems described above, preferred embodiments of the present invention provide a display device that ensures high display quality.

A display device according to a preferred embodiment of the present invention has multiple pixels and includes: multiple pixel electrodes, which are provided for the respective pixels; and multiple signal lines, which are connected to the pixel electrodes by way of their associated switching elements. The pixel electrodes include a first pixel electrode and a second pixel electrode. The signal lines include a first signal line connected to the first pixel electrode and a second signal line connected to the second pixel electrode. The distance between one end of the first pixel electrode and the centerline of the first signal line is greater than the distance between one end of the second pixel electrode and the centerline of the second signal line. Alternatively, the distance between the other end of the first pixel electrode and the centerline of an adjacent signal line, which is located on the opposite side of the first pixel electrode from the first signal line, is greater than the distance between the other end of the second pixel electrode and the centerline of another adjacent signal line, which is located on the opposite side of the second pixel electrode from the second signal line.

Another display device according to another preferred embodiment of the present invention has multiple pixels and includes: multiple pixel electrodes, which are provided for the respective pixels; and multiple signal lines, which are connected to the pixel electrodes by way of their associated switching elements. The pixel electrodes include a first pixel electrode and a second pixel electrode. The signal lines include a first signal line connected to the first pixel electrode and a second signal line connected to the second pixel electrode. A shield electrode is arranged under a portion of the first pixel electrode closer to the first signal line but no shield electrode is arranged under a portion of the second pixel electrode closer to the second signal line. Alternatively, a shield electrode is arranged under a portion of the first pixel electrode closer to an adjacent signal line, which is located on the opposite side of the first pixel electrode from the first signal line, but no shield electrode is arranged under a portion of the second pixel electrode closer to another adjacent signal line, which is located on the opposite side of the second pixel electrode from the second signal line.

Still another display device according to yet another preferred embodiment of the present invention has multiple pixels and includes: multiple pixel electrodes, which are provided for the respective pixels; and multiple signal lines, which are connected to the pixel electrodes by way of their associated switching elements. The pixel electrodes include a first pixel electrode and a second pixel electrode. The signal lines include a first signal line connected to the first pixel electrode and a second signal line connected to the second pixel electrode. A shield electrode, which is arranged under a portion of the first pixel electrode closer to the first signal line, protrudes from the first pixel electrode but another shield electrode, which is arranged under a portion of the second pixel electrode closer to the second signal line, does not protrude from the second pixel electrode. Alternatively, still another shield electrode, arranged under a portion of the first pixel electrode closer to an adjacent signal line, which is located on the opposite side of the first pixel electrode from the first signal line, protrudes from the first pixel electrode but yet another shield electrode, arranged under a portion of the second pixel electrode closer to another adjacent signal line, which is located on the opposite side of the second pixel electrode from the second signal line, does not protrude from the second pixel electrode.

Yet another display device according to a further preferred embodiment of the present invention has multiple pixels and includes: multiple pixel electrodes, which are provided for the respective pixels; and multiple signal lines, which are connected to the pixel electrodes by way of their associated switching elements. The pixel electrodes include a first pixel electrode and a second pixel electrode. The signal lines include a first signal line connected to the first pixel electrode and a second signal line connected to the second pixel electrode. A shield electrode, which is arranged under a portion of the first pixel electrode closer to the first signal line, is connected to either a scan line or a storage capacitor line but another shield electrode, which is arranged under a portion of the second pixel electrode closer to the second signal line, is connected to neither a scan line nor a storage capacitor line. Alternatively, still another shield electrode, arranged under a portion of the first pixel electrode closer to an adjacent signal line, which is located on the opposite side of the first pixel electrode from the first signal line, is connected to either a scan line or a storage capacitor line but yet another shield electrode, arranged under a portion of the second pixel electrode closer to another adjacent signal line, which is located on the opposite side of the second pixel electrode from the second signal line, is connected to neither a scan line nor a storage capacitor line.

In one preferred embodiment, the multiple pixels include pixels to represent multiple different colors, and according to an XYZ color system, the first pixel electrode has a greater Y value than the second pixel electrode.

In another preferred embodiment, the aperture ratio of the pixel including the first pixel electrode is substantially equal to that of the pixel including the second pixel electrode.

In still another preferred embodiment, the multiple pixels include pixels to represent multiple different colors, and one repeat unit of those multiple colors includes the first and second pixel electrodes.

In this particular preferred embodiment, according to an XYZ color system, the first pixel electrode has a greater Y value than the second pixel electrode.

Alternatively or additionally, in each of the repeat units of the multiple colors, the aperture ratios of all pixels are substantially equal to each other.

In another preferred embodiment, each of the repeat units of the multiple colors includes two types of pixel structures, the pixel structures include a first pixel structure associated with the first pixel electrode, and the color represented by the pixel with the first pixel structure is only one of the multiple colors that form the repeat unit.

In this particular preferred embodiment, the pixel with the first pixel structure represents one of the multiple colors that has the largest Y value according to the XYZ color system.

In a specific preferred embodiment, the multiple pixels include a red pixel representing the color red, a green pixel representing the color green, and a blue pixel representing the color blue, and the pixel with the first pixel structure is the green pixel.

In an alternative preferred embodiment, the multiple pixels include a red pixel representing the color red, a green pixel representing the color green, a blue pixel representing the color blue, and a white pixel representing the color white and the pixel with the first pixel structure is the white pixel.

In yet another preferred embodiment, a first black matrix, having a predetermined width and running in the same direction as the first signal line, is arranged over the first signal line and a second black matrix, having a predetermined width and running in the same direction as the second signal line, is arranged over the second signal line. Supposing the distance between the centerline of the first signal line and one end of the first black matrix closer to the first pixel electrode is identified by D1(1), the distance between the centerline of the second signal line and one end of the second black matrix closer to the second pixel electrode is identified by D1(2), the distance between the centerline of an adjacent signal line, which is located on the opposite side of the first pixel electrode from the first signal line, and one end of an adjacent black matrix, which is located on the opposite side of the first pixel electrode from the first black matrix, on the side closer to the first pixel electrode, is identified by D2(1), and the distance between the centerline of another adjacent signal line, which is located on the opposite side of the second pixel electrode from the second signal line, and one end of another adjacent black matrix, which is located on the opposite side of the second pixel electrode from the second black matrix, on the side closer to the second pixel electrode, is identified by D2(2), either D1(1)>D1(2) or D2(1)>D2(2) is satisfied.

In yet another preferred embodiment, each of the repeat units of the multiple colors includes two types of pixel structures. The pixel structures include a first pixel structure associated with the first pixel electrode and a second pixel structure associated with the second pixel electrode. The colors represented by the pixel with the first pixel structure are two or more of the multiple colors that form the repeat unit.

In this particular preferred embodiment, the pixel with the first pixel structure represents one of the multiple colors that has the largest Y value according to the XYZ color system.

In yet another preferred embodiment, the multiple pixels include a red pixel representing the color red, a green pixel representing the color green, a blue pixel representing the color blue, and a white pixel representing the color white and the pixels with the first pixel structure are the white pixel and the green pixel.

In yet another preferred embodiment, a first black matrix, having a predetermined width and running in the same direction as the first signal line, is arranged over the first signal line and a second black matrix, having a predetermined width and running in the same direction as the second signal line, is arranged over the second signal line. Supposing the distance between the centerline of the first signal line and one end of the first black matrix closer to the first pixel electrode is identified by D1(1), the distance between the centerline of the second signal line and one end of the second black matrix closer to the second pixel electrode is identified by D1(2), the distance between the centerline of an adjacent signal line, which is located on the opposite side of the first pixel electrode from the first signal line, and one end of an adjacent black matrix, which is located on the opposite side of the first pixel electrode from the first black matrix, on the side closer to the first pixel electrode, is identified by D2(1), and the distance between the centerline of another adjacent signal line, which is located on the opposite side of the second pixel electrode from the second signal line, and one end of another adjacent black matrix, which is located on the opposite side of the second pixel electrode from the second black matrix, on the side closer to the second pixel electrode, is identified by D2(2), either D1(1)>D1(2) or D2(1)>D2(2) is satisfied.

Yet another display device according to an additional preferred embodiment of the present invention has multiple pixels that are arranged in a matrix pattern and includes: multiple pixel electrodes, which are provided for the respective pixels; multiple signal lines, which are connected to the pixel electrodes by way of their associated switching elements and which run in a column direction of the matrix pattern. The pixel electrodes include a first pixel electrode and a second pixel electrode. The signal lines include a first signal line connected to the first pixel electrode and a second signal line connected to the second pixel electrode. A capacitor formed between the first pixel electrode and the first signal line has smaller capacitance than a capacitor formed between the second pixel electrode and the second signal line. Alternatively, a capacitor formed between the first pixel electrode and an adjacent signal line, which is located on the opposite side of the first pixel electrode from the first signal line, has smaller capacitance than a capacitor formed between the second pixel electrode and another adjacent signal line, which is located on the opposite side of the second pixel electrode from the second signal line.

Yet another display device according to another preferred embodiment of the present invention has multiple pixels that are arranged in a matrix pattern and includes: multiple pixel electrodes, which are provided for the respective pixels; multiple signal lines, which are connected to the pixel electrodes by way of their associated switching elements and which run in a column direction of the matrix pattern. The pixel electrodes include a first pixel electrode and a second pixel electrode. The signal lines include a first signal line connected to the first pixel electrode and a second signal line connected to the second pixel electrode. A value obtained by dividing capacitance between the first pixel electrode and the first signal line by the total capacitance of the first pixel electrode is smaller than a value obtained by dividing capacitance between the second pixel electrode and the second signal line by the total capacitance of the second pixel electrode. Alternatively, a value obtained by dividing capacitance between the first pixel electrode and an adjacent signal line, which is located on the opposite side of the first pixel electrode from the first signal line, by the total capacitance of the first pixel electrode is smaller than a value obtained by dividing capacitance between the second pixel electrode and another adjacent signal line, which is located on the opposite side of the second pixel electrode from the second signal line, by the total capacitance of the second pixel electrode.

In a specific preferred embodiment, the multiple pixels include pixels to represent multiple different colors, and according to an XYZ color system, the first pixel electrode has a greater Y value than the second pixel electrode.

In another preferred embodiment, the aperture ratio of the pixel including the first pixel electrode is substantially equal to that of the pixel including the second pixel electrode.

In still another preferred embodiment, the multiple pixels include pixels to represent multiple different colors, and one repeat unit of those multiple colors includes the first and second pixel electrodes.

In this particular preferred embodiment, according to an XYZ color system, the first pixel electrode has a greater Y value than the second pixel electrode.

In a more specific preferred embodiment, in each of the repeat units of the multiple colors, the aperture ratios of all pixels are substantially equal to each other.

In yet another preferred embodiment, each of the repeat units of the multiple colors includes n types of pixel structures. The pixel structures include an $m^{th}$ pixel structure (where m=1 to n) associated with an $m^{th}$ pixel electrode. The pixel electrodes include the $m^{th}$ pixel electrode included in the $m^{th}$ pixel structure. The signal lines include an $m^{th}$ signal line connected to the $m^{th}$ pixel electrode. Supposing a capacitor formed between the $m^{th}$ pixel electrode and the $m^{th}$ signal line has capacitance Csd1($m$) and a capacitor formed between the $m^{th}$ pixel electrode and an adjacent signal line, which is located on the opposite side of the $m^{th}$ pixel electrode from the $m^{th}$ signal line, has capacitance Csd2($m$), either Csd1(1)<Csd1(2)=Csd1(3)= . . . =Csd1($n$) or Csd2(1)<Csd2(2)=Csd2(3)= . . . =Csd2($n$) is satisfied.

In this particular preferred embodiment, the pixel with the first pixel structure represents one of the multiple colors that has the largest Y value according to the XYZ color system.

In a specific preferred embodiment, the multiple pixels include a red pixel representing the color red, a green pixel representing the color green, and a blue pixel representing the color blue, and the pixel with the first pixel structure is the green pixel.

In an alternative preferred embodiment, the multiple pixels include a red pixel representing the color red, a green pixel representing the color green, a blue pixel representing the color blue, and a white pixel representing the color white and the pixel with the first pixel structure is the white pixel.

In yet another preferred embodiment, an $m^{th}$ black matrix (where m=1 to n), having a predetermined width and running in the same direction as the $m^{th}$ signal line, is arranged over the $m^{th}$ signal line. Supposing the distance between the centerline of the $m^{th}$ signal line and one end of the $m^{th}$ black matrix closer to the $m^{th}$ pixel electrode is identified by D1($m$), and the distance between the centerline of an adjacent signal line, which is located on the opposite side of the $m^{th}$ pixel electrode from the $m^{th}$ signal line, and one end of an adjacent black matrix, which is located on the opposite side of the $m^{th}$ pixel electrode from the $m^{th}$ black matrix, on the side closer to the $m^{th}$ pixel electrode, is identified by D2($m$), either D1(1)>D1(2)=D1(3)= . . . D1($n$) or D2(1)>D2(2)= D2(3)= . . . D2($n$) is satisfied.

In yet another preferred embodiment, each of the repeat units of the multiple colors includes n types of pixel structures. The pixel structures include an $m^{th}$ pixel structure (where m=1 to n) associated with an $m^{th}$ pixel electrode. The pixel electrodes include the $m^{th}$ pixel electrode included in the $m^{th}$ pixel structure. The signal lines include an $m^{th}$ signal line connected to the $m^{th}$ pixel electrode. Supposing a capacitor formed between the $m^{th}$ pixel electrode and the $m^{th}$ signal line has capacitance Csd1($m$) and a capacitor formed between the $m^{th}$ pixel electrode and an adjacent signal line, which is located on the opposite side of the $m^{th}$ pixel electrode from the $m^{th}$ signal line, has capacitance Csd2($m$), either Csd1(1)≦Csd1(2)≦Csd1(3)≦ . . . ≦Csd1($n$) or Csd2(1)≦Csd2(2)≦Csd2(3)≦ . . . ≦Csd2($n$) is satisfied.

In yet another preferred embodiment, supposing the Y value of a color represented by a pixel with the $m^{th}$ pixel structure (where m=1 to n) is identified by Y(m) according to an XYZ color system, Y(1)>Y(2)>Y(3)> . . . >Y(n) is satisfied.

In a specific preferred embodiment, the multiple pixels include a red pixel representing the color red, a green pixel representing the color green, and a blue pixel representing the color blue, and the first, second and third pixel electrodes are associated with the green, red, and blue pixels, respectively.

In an alternative preferred embodiment, the multiple pixels include a red pixel representing the color red, a green pixel representing the color green, a blue pixel representing the color blue, and a white pixel representing the color white, and the first, second third and fourth pixel electrodes are associated with the white, green, red, and blue pixels, respectively.

In yet another preferred embodiment, an $m^{th}$ black matrix (where m=1 to n), having a predetermined width and running in the same direction as the $m^{th}$ signal line, is arranged over the $m^{th}$ signal line. Supposing the distance between the centerline of the $m^{th}$ signal line and one end of the $m^{th}$ black matrix closer to the $m^{th}$ pixel electrode is identified by D1($m$), and the distance between the centerline of an adjacent signal line, which is located on the opposite side of the $m^{th}$ pixel electrode from the $m^{th}$ signal line, and one end of an adjacent black matrix, which is located on the opposite side of the $m^{th}$ pixel electrode from the $m^{th}$ black matrix, on the side closer to the $m^{th}$ pixel electrode, is identified by D2($m$), either D1(1)≧D1(2)≧D1(3)≧ . . . ≧D1($n$) or D2(1)≧D2(2)≧ D2(3)≧ . . . ≧D2($n$) is satisfied.

A color filter substrate according to various preferred embodiments of the present invention is designed for use in a display device that has a display area defined by multiple pixels. The color filter substrate includes multiple pixel regions, which are provided for the respective pixels, and multiple black matrices, which are arranged on boundaries between the pixel regions. The pixel regions include a pixel region to represent multiple different colors. In each repeat unit of the multiple different colors, the black matrices include a first black matrix and a second black matrix. The first black matrix has a greater width than the second black matrix.

In one preferred embodiment, in each of the repeat units of the multiple different colors, a pixel region representing one of the multiple different colors that has the highest luminance is located adjacent to the first black matrix.

In another preferred embodiment, in each of the repeat units of the multiple different colors, the aperture ratios of all of the pixel regions are substantially equal to each other.

Accordingly, a preferred embodiment of the present invention provides a display device that ensures high display quality.

Other features, elements, steps, characteristics and advantages of the present invention will become more apparent from the following detailed description of preferred embodiments of the present invention with reference to the attached drawings.

BRIEF DESCRIPTION OF THE DRAWINGS

FIGS. 3A and 3B illustrate color display pixels in the first preferred embodiment, wherein FIG. 3A is a plan view schematically illustrating the color display pixels and FIG. 3B is a cross-sectional view illustrating the arrangement of signal lines, pixel electrodes, CFs and BM for the color display pixels.

FIGS. 4A and 4B illustrate color display pixels in a second preferred embodiment of the present invention, wherein FIG. 4A is a plan view schematically illustrating the color display pixels and FIG. 4B is a cross-sectional view illustrating the arrangement of signal lines, pixel electrodes, CFs and BM for the color display pixels.

FIGS. 5A and 5B illustrate color display pixels in a third preferred embodiment of the present invention, wherein FIG. 5A is a plan view schematically illustrating the color display pixels and FIG. 5B is a cross-sectional view illustrating the arrangement of signal lines, pixel electrodes, CFs and BM for the color display pixels.

FIGS. 7A and 7B illustrate color display pixels in a fifth preferred embodiment of the present invention, wherein FIG. 7A is a plan view schematically illustrating the color display pixels and FIG. 7B is a cross-sectional view illustrating the arrangement of signal lines, pixel electrodes, and shield electrodes for the color display pixels.

FIGS. 8A and 8B illustrates modified examples of the fifth preferred embodiment, wherein FIG. 8A is a plan view schematically illustrating color display pixels as a first modified example and FIG. 8B is a plan view schematically illustrating color display pixels as a second modified example.

FIGS. 9A, 9B and 9C illustrate color display pixels according to a sixth preferred embodiment of the present invention, wherein FIG. 9A is a plan view schematically illustrating color display pixels according to the sixth preferred embodiment, and FIGS. 9B and 9C are plan views schematically illustrating respective color display pixels as first and second modified examples of the sixth preferred embodiment.

FIGS. 11A and 11B illustrate how to perform a special type of polarity inversion drive, which is applicable to the seventh preferred embodiment, wherein FIG. 11A shows a relation between the outputs of a source driver and signal lines and FIG. 11B shows signals to be supplied to the signal lines.

FIGS. 12A and 12B show what effects are achieved by a preferred embodiment of the present invention and its modified example, wherein FIG. 12A shows how the aperture ratio changes with the shadowing rate and the interblock variation level and FIG. 12B shows how much the shadowing rate can be reduced by adopting a special type of polarity inversion drive.

DETAILED DESCRIPTION OF THE PREFERRED EMBODIMENTS

Preferred Embodiment 1

Hereinafter, a first preferred embodiment of a display device according to the present invention will be described with reference to the accompanying drawings.

Figure 1:
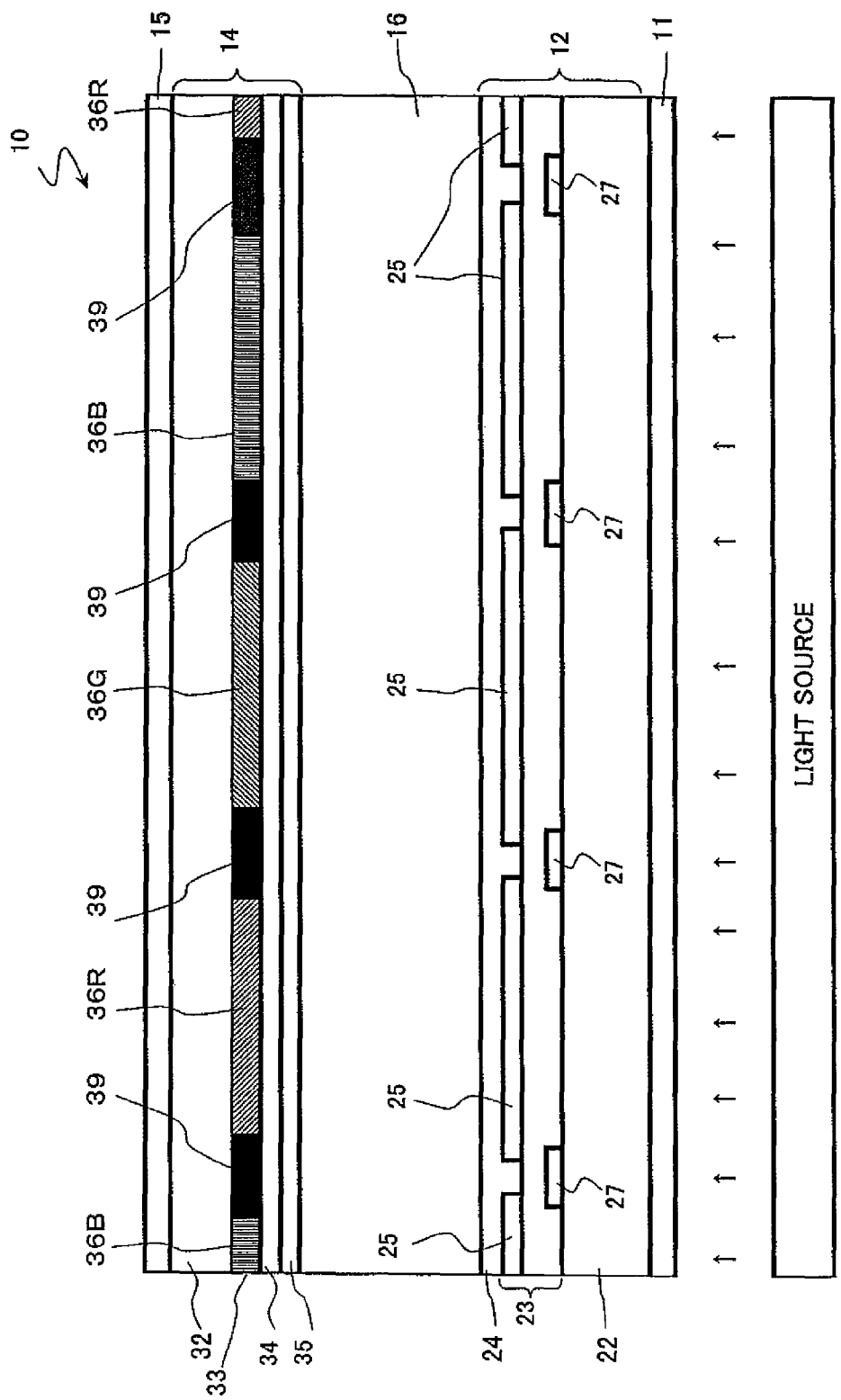
FIG. 1 is a cross-sectional view illustrating a display device as a first preferred embodiment of the present invention.

FIG. 1 schematically illustrates the cross-sectional shape of a display device 10 as a first preferred embodiment of the present invention. This display device 10 is an active-matrix-addressed TN mode liquid crystal display (LCD), and more specifically, an SHA (super high aperture) type LCD that adopts the normally white mode. As shown in FIG. 1, the display device 10 includes a polarizer 11, an active-matrix substrate 12, a color filter (CF) substrate 14, another polarizer 15, and a liquid crystal layer 16 including a liquid crystal material that has been injected into the gap between the active-matrix substrate 12 and the CF substrate 14.

The active-matrix substrate 12 includes a glass substrate 22, an electrode layer 23, and an alignment film 24. The electrode layer 23 includes pixel electrodes 25, TFTs 26 (see FIG. 2), signal lines 27 and scan lines 28 (see FIG. 2, too). The CF substrate 14 includes a glass substrate 32, a color filter (CF) layer 33, a transparent electrode 34 and an alignment film 35. The CF layer 33 includes red color filters (R-CFs) 36R, green color filters (G-CFs) 36G, blue color filters (B-CFs) 36B and a black matrix (BM) 39.

Figure 2:
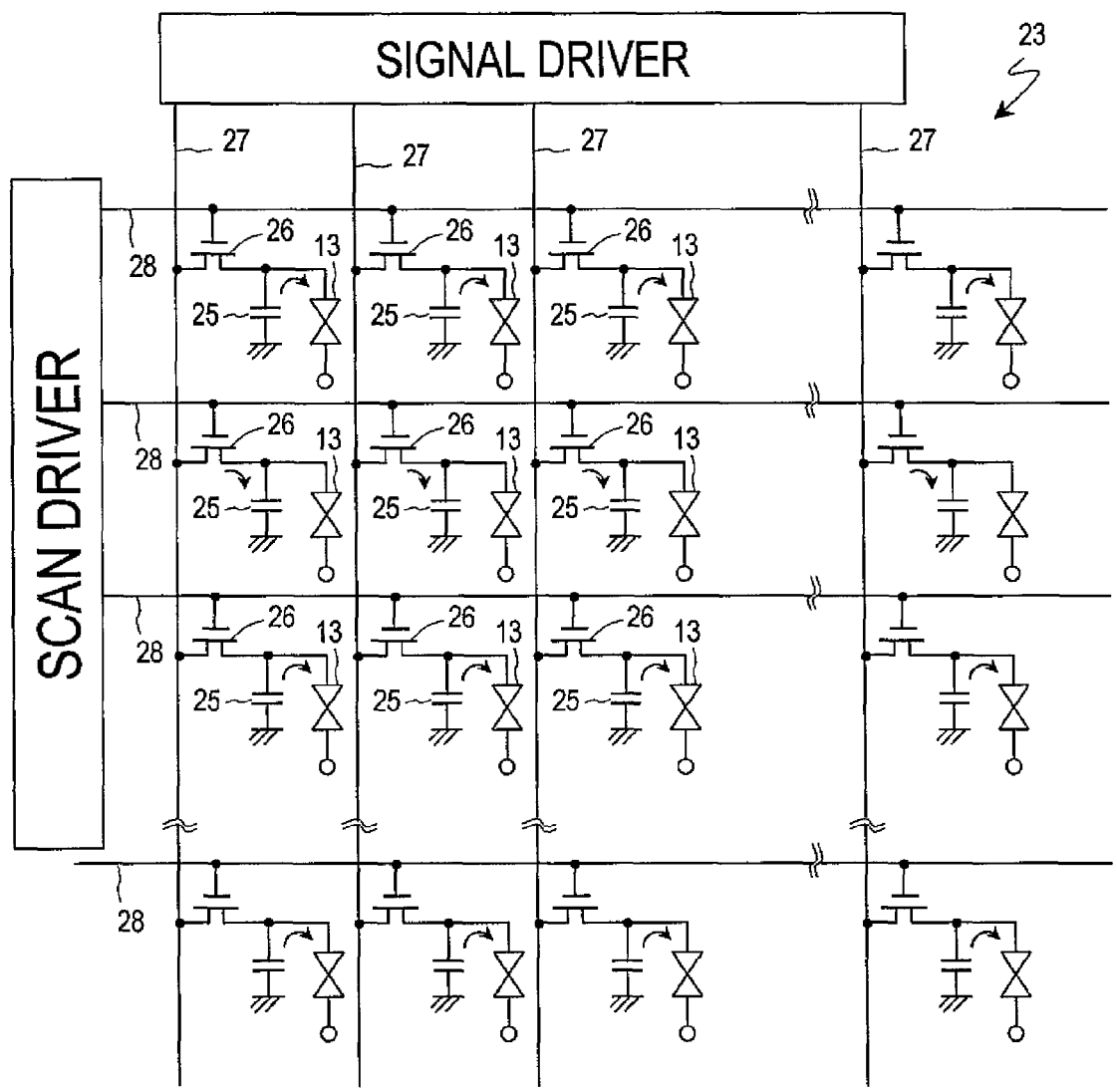
FIG. 2 schematically illustrates the wiring structure of the electrode layer of the display device of the first preferred embodiment of the present invention.

FIG. 2 schematically illustrates the wiring structure of the electrode layer 23 of the display device 10. As shown in FIG. 2, in this electrode layer 23, the signal lines 27 and the scan lines 28 are arranged so as to intersect with each other and the pixel electrodes 25 are arranged in a matrix pattern such that each of those pixel electrodes 25 is surrounded with its associated signal lines 27 and scan lines 28.

A scan signal is supplied from a scan driver to one of those scan lines 28 after another by a line sequential technique. Meanwhile, a display signal is supplied from a signal driver to respective pixel electrodes 25 through each of the signal lines 27. The pixel electrodes 25 function as signal storage capacitors that retain the signal supplied through the signal line 27. In each pixel, the liquid crystal capacitor 13 is excited by the signal stored in the pixel electrode 25 until a scan operation is performed on the next frame.

The signal lines 27, the scan lines 28 and the pixel electrodes 25 are respectively connected to the source, gate and drain of the TFTs 26. And upon receiving the signal from its associated scan line 28 as a gate signal, each of those TFTs 26 functions as a switching element that turns ON and OFF to selectively pass a signal, which has come through the signal line 27, to the pixel electrode 25.

FIG. 3A is a plan view schematically illustrating a unit of display (which will be referred to herein as a "set of color display pixels") in the display area of the display device 10. FIG. 3B is a cross-sectional view showing how the signal lines 27, the pixel electrodes 25, the R-CFs 36R, the G-CFs 36G, the B-CFs 36B and the BM 39 shown in FIG. 3A look when viewed from the direction that is parallel to the surface of the substrate (i.e., when viewed from the front of the paper of FIG. 3A). In these drawings, illustration of the components other than the pixel electrodes 25, the signal lines 27, the scan lines 28, the R-CFs 36R, the G-CFs 36G, the B-CFs 36B and the BM 39 is omitted.

In the following description, pixels to represent the colors red, green and blue will be referred to herein as a "red pixel R", a "green pixel G" and a "blue pixel B", respectively. Also, the respective pixel electrodes 25 included in those red, green and blue pixels R, G and B will be referred to herein as a "red pixel electrode 25R", a "green pixel electrode 25G" and a "blue pixel electrode 25B", respectively. Furthermore, the respective signal lines 27 to supply the signal to the red, green and blue pixel electrodes 25R, 25G and 25B will be referred to herein as a "red signal line 27R", a "green signal line 27G" and a "blue signal line 27B", respectively.

As shown in FIGS. 3A and 3B, each set of color display pixels consists of a red pixel R, a green pixel G and a blue pixel B. Such sets of color display pixels are arranged continuously in column and row directions, thereby forming a display area on the screen. Since the LCD of this preferred embodiment is an SHA type LCD, the signal lines 27 and the scan lines 28 are arranged so as to overlap with the peripheral portions of adjacent pixel electrodes 25.

Specifically, each red signal line 27R is arranged such that at least a portion thereof runs between its associated red pixel electrode 25R and a blue pixel electrode 25B located on the left-hand side of that red pixel electrode 25R. Each green signal line 27G is arranged such that at least a portion thereof runs between its associated green pixel electrode 25G and a red pixel electrode 25R located on the left-hand side of that green pixel electrode 25G. And each blue signal line 27B is arranged such that at least a portion thereof runs between its associated blue pixel electrode 25B and a green pixel electrode 25G located on the left-hand side of that blue pixel electrode 25B.

The gap between a green pixel electrode 25G and its associated green signal line 27G is greater than the one between the adjacent red pixel electrode 25R and that green signal line 27G. Also, the gap between the green pixel electrode 25G and a blue signal line 27B is greater than the one between the adjacent blue pixel electrode 25B and that blue signal line 27B. By leaving a greater gap between a green pixel electrode 25G and the adjacent green and blue signal lines 27G and 27B than between a pixel electrode 25 of any other color and its adjacent signal line 27 in this manner, the parasitic capacitance $Csd1(G)$ between the green pixel electrode 25G and the green signal line 27G can be smaller than the parasitic capacitance $Csd1(R)$ between the red pixel electrode 25R and the red signal line 27R or the parasitic capacitance $Csd1(B)$ between the blue pixel electrode 25B and the blue signal line 27B:

$$Csd1(G) < Csd1(R), Csd1(B)$$

Also, the parasitic capacitance $Csd2(G)$ between the green pixel electrode 25G and the blue signal line 27B is smaller than the parasitic capacitance $Csd2(B)$ between the blue pixel electrode 25B and the red signal line 27R or the parasitic capacitance Csd2(R) between the red pixel electrode 25B and the green signal line 27G:

$$Csd2(G)<Csd2(B), Csd2(R)$$

Thus, the parasitic capacitance Csd between each green pixel electrode 25G and its associated signal line 27 becomes smaller than the parasitic capacitance Csd between a pixel electrode of any other color and its associated signal line 27. That is why in presenting an image by the line inversion drive technique, the potential at the green pixel electrode 25G (i.e., the drain potential Vd) is affected less by the parasitic capacitance Csd than the red pixel electrode 25R or the blue pixel electrode 25B is. As a result, the variation $\Delta Vsd$ in drain potential due to the presence of the parasitic capacitance Csd, given by $\Delta Vsd=Csd/(Cgd+Clc+Ccs+Csd)\times\Delta Vs$, can be reduced.

In performing a dot inversion drive, Csd1=Csd2 is preferably satisfied for every color. This is because the influences of Csd1 and Csd2 on the drain potential would cancel each other and the frequency of occurrence of the shadowing phenomenon could be reduced in that case.

Among the three primary colors of red, green and blue, green has a greater Y value than any other color according to the XYZ color system. By adopting the configuration described above, the variation in the lightness of the color green, which has a higher degree of lightness (i.e., a greater Y value or less hue) than any other color in the R, G and B to be represented, can be smaller than the variation in the lightness of any other color. As a result, particularly when a line inversion drive technique is adopted, the display operation can be performed with the shadowing phenomenon either rarely allowed to occur or suppressed to a hardly noticeable level, if ever.

Also, if the line-to-line pitch varies between blocks due to a misalignment that has occurred during the manufacturing process of a display device, for example, the Csd variations $\Delta$Csd of the respective colors satisfy the following inequalities:

$$\Delta Csd1(G)<\Delta Csd1(R), \Delta Csd1(B)$$

$$\Delta Csd2(G)<\Delta Csd2(R), \Delta Csd2(B)$$

In this manner, when a display operation is conducted in RGB, the variation in the lightness of the color green, which has the highest degree of lightness, can be smaller than that of any other color, thus reducing the difference in lightness or color tone between blocks on the monitor screen. Consequently, particularly in the dot inversion drive, a display operation can be conducted with the interblock variation allowed to occur rarely, or made hardly noticeable, if ever.

It should be noted that the feedthrough voltages $\Delta Vd$ for the pixels of the respective colors are preferably equalized with each other by adjusting the widths of the storage capacitor electrodes, for example.

As shown in FIGS. 3A and 3B, the BM 39 is provided between the R-CF 36R and the G-CF 36G, between the G-CF 36G and the B-CF 36B, and between the B-CF 36B and the R-CF 36R. However, the center of width of a portion of the BM 39 located between the R-CF 36R and the G-CF 36G (i.e., over the green signal line 27G) is closer to the G-CF 36G (or the green pixel electrode 25G) than the centerline of the green signal line 27G is. Likewise, the center of width of a portion of the BM 39 located between the G-CF 36G and the B-CF 36B (i.e., over the signal line 27B) is also closer to the G-CF 36G (or the green pixel electrode 25G) than the centerline of the blue signal line 27B is. It should be noted that the widths of those portions of the BM 39 located over the green and blue signal lines 27G and 27B, respectively, are greater than that of a portion of the BM 39 located over the red signal line 27R.

In this preferred embodiment, the aperture ratios of the red, green and blue pixels are supposed to be substantially equal to each other. That is why the occurrence of the shadowing and interblock variation can be substantially prevented with a high aperture ratio and a broad color representation range of the displayed image maintained in the display area of a display device.

According to another modified example of this preferred embodiment, the parasitic capacitances Csd(G), Csd(R) and Csd(B) of the green, red and blue pixels may satisfy the following relation:

$$Csd(G) \leq Csd(R) \leq Csd(B)$$

Among the three primary colors of red, green and blue, the color red has the second highest Y value (or degree of lightness). That is why according to this modified example, the parasitic capacitance Csd of the color with the higher Y value can be reduced more significantly. As a result, a display device that has a great aperture ratio and that rarely produces the shadowing or interblock variation is realized. It should be noted that the red, green and blue pixels do not have to be arranged as shown in FIG. 3 but may also be arranged in any other order.

This preferred embodiment could also be modified such that the gaps between the green pixel electrode 25G and the green and blue signal lines 27G and 27B are reduced. In that case, the decrease in aperture ratio can be less significant than in the first preferred embodiment.

To stop the occurrence of the (vertical) shadowing and interblock variation, it seems to be effective to reduce the parasitic capacitance of every pixel. In that case, however, the gap between every signal line and its adjacent pixel electrode and the gap between the pixel electrodes would both widen, thus decreasing the aperture ratio and the transmittance significantly. In contrast, the liquid crystal display device of the first preferred embodiment described above and its modified examples can reduce the parasitic capacitance of only a color with high luminance that will have a lot of influence on the shadowing and interblock variation. As a result, the shadowing and interblock variation can be reduced effectively with the decrease in transmittance minimized.

Preferred Embodiment 2

Hereinafter, a second preferred embodiment of a display device according to the present invention will be described.

Figure 4A:
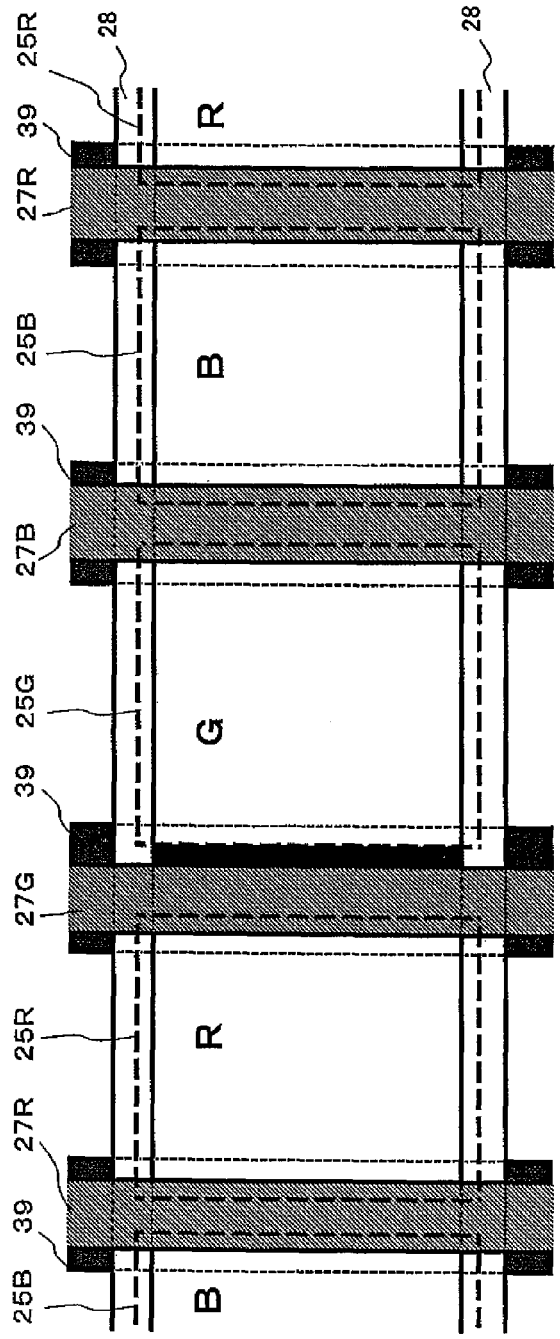
Figure 4B:
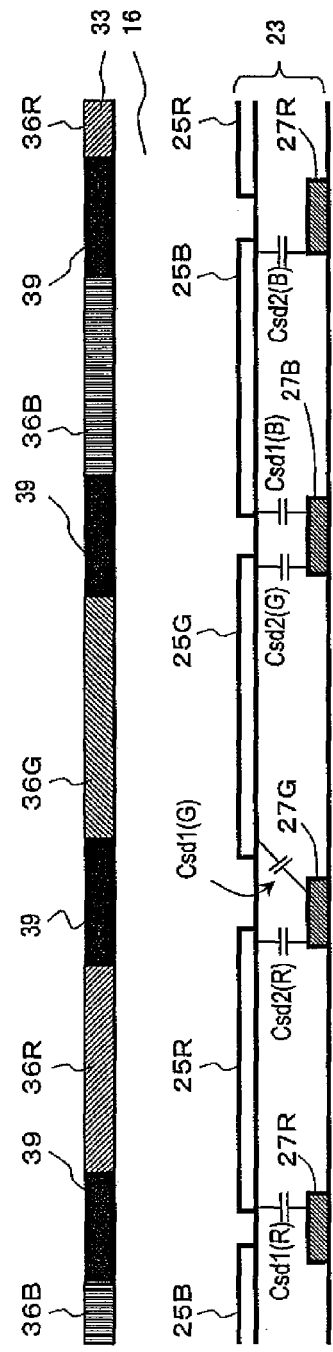

FIG. 4A is a plan view schematically illustrating a set of color display pixels according to this second preferred embodiment. FIG. 4B is a cross-sectional view showing how the signal lines 27, the pixel electrodes 25, the R-CFs 36R, the G-CFs 36G, the B-CFs 36B and the BM 39 shown in FIG. 4A look when viewed from the direction that is parallel to the surface of the substrate.

As shown in these drawings, in this preferred embodiment, the gap between the green pixel electrode 25G and the green signal line 27G is wider than the gap between the red pixel electrode 25R and the red signal line 27R or the gap between the blue pixel electrode 25B and the blue signal line 27B. But the gap between the green pixel electrode 25G and the blue signal line 27B is equal to the gap between the red pixel electrode 25R and the green signal line 27G and the gap between the blue pixel electrode 25B and the red signal line

27R. The other components are arranged as in the first preferred embodiment described above.

Alternatively, the gap between the green pixel electrode 25G and the green signal line 27G may be equal to the gap between the red pixel electrode 25R and the red signal line 27R and the gap between the blue pixel electrode 25B and the blue signal line 27B. And the gap between the green pixel electrode 25G and the blue signal line 27B may be wider than the gap between the red pixel electrode 25R and the green signal line 27G and the gap between the blue pixel electrode 25B and the red signal line 27R.

As in the first preferred embodiment described above, the parasitic capacitances between the pixel electrodes and the signal lines satisfy:

$Csd1(G)<Csd1(R),Csd1(B)$ and $Csd2(G)=Csd2(R),Csd2(B)$ or $Csd1(G)=Csd1(R),Csd1(B)$ and $Csd2(G)<Csd2(B),Csd2(R)$ In such an arrangement, the capacitance between the green pixel electrode 25G and only one of the two adjacent signal lines thereof can be smaller than the capacitance between a pixel electrode of any other color and its adjacent signal line. In this preferred embodiment, the aperture ratios of the respective colors are also supposed to be substantially equal to each other.

According to this preferred embodiment, the occurrence of the shadowing and interblock variation can be substantially prevented with a high aperture ratio and a broad color representation range of the displayed image maintained in the display area of a display device. Besides, according to this second preferred embodiment, the decrease in aperture ratio in the display area can be even less significant than in the first preferred embodiment.

To stop the occurrence of the (vertical) shadowing and interblock variation, it seems to be effective to reduce the parasitic capacitance of every pixel. In that case, however, the gap between every signal line and its adjacent pixel electrode and the gap between the pixel electrodes would both widen, thus decreasing the aperture ratio and the transmittance significantly. In contrast, the liquid crystal display device of the second preferred embodiment described above can reduce the parasitic capacitance of only a color with high luminance that will have a lot of influence on the shadowing and interblock variation. As a result, the shadowing and interblock variation can be reduced effectively with the decrease in transmittance minimized.

Preferred Embodiment 3

Hereinafter, a third preferred embodiment of a display device according to the present invention will be described.

FIG. 5A is a plan view schematically illustrating a set of color display pixels according to this third preferred embodiment. FIG. 5B is a cross-sectional view showing how the signal lines 27, the pixel electrodes 25, the R-CFs 36R, the G-CFs 36G, the B-CFs 36B and the BM 39 shown in FIG. 5A look when viewed from the direction that is parallel to the surface of the substrate.

The first and second preferred embodiments described above are SHA type LCDs but this third preferred embodiment is a non-SHA type LCD. That is why when the display device is viewed perpendicularly, neither the signal lines 27 nor the scan lines 28 overlap with the pixel electrodes 25. Also, in general, when scan lines do not overlap with pixel electrodes, the black matrix needs to run horizontally, too.

In this preferred embodiment, the gap between the green pixel electrode 25G and the green signal line 27G is wider than the gap between the red pixel electrode 25R and the red signal line 27R. And the gap between the green pixel electrode 25G and the blue signal line 27B is wider than the gap between the blue pixel electrode 25B and the red signal line 27R. That is why as in the first preferred embodiment described above, the parasitic capacitances between the pixel electrodes and the signal lines satisfy:

$Csd1(G)<Csd1(R),Csd1(B)$ $Csd2(G)<Csd2(B),Csd2(R)$

With such an arrangement, the capacitance between the green pixel electrode 25G and its adjacent signal line can be smaller than the capacitance between a pixel electrode of any other color and its adjacent signal line. In this preferred embodiment, the aperture ratios of the respective colors are also substantially equal to each other.

According to this preferred embodiment, the occurrence of the shadowing and interblock variation can be substantially prevented.

When a dot inversion drive is performed, every color preferably further satisfies $Csd1=Csd2$. In that case, the influences of Csd1 and Csd2 on the drain potential would cancel each other, thus preventing the occurrence of shadowing.

To stop the occurrence of the (vertical) shadowing and interblock variation, it seems to be effective to reduce the parasitic capacitance of every pixel. In that case, however, the gap between every signal line and its adjacent pixel electrode and the gap between the pixel electrodes would both widen, thus decreasing the aperture ratio and the transmittance significantly. In contrast, the liquid crystal display device of the third preferred embodiment described above can reduce the parasitic capacitance of only a color with high luminance that will have a lot of influence on the shadowing and interblock variation. As a result, the shadowing and interblock variation can be reduced effectively with the decrease in transmittance minimized.

In this third preferred embodiment, the gap between the green pixel electrode 25G and the green signal line 27G is supposed to be wider than the gap between the red pixel electrode 25R and the red signal line 27R. And the gap between the green pixel electrode 25G and the blue signal line 27B is supposed to be wider than the gap between the blue pixel electrode 25B and the red signal line 27R. However, only the gap between the green pixel electrode 25G and the green signal line 27G may be wider than the gap between the red pixel electrode 25R and the red signal line 27R but the gap between the green pixel electrode 25G and the blue signal line 27B may be equal to the gap between the blue pixel electrode 25B and the red signal line 27R.

Alternatively, only the gap between the green pixel electrode 25G and the blue signal line 27B may be wider than the gap between the blue pixel electrode 25B and the red signal line 27R. But the gap between the green pixel electrode 25G and the green signal line 27G may be equal to the gap between the red pixel electrode 25R and the red signal line 27R.

Preferred Embodiment 4

Hereinafter, a fourth preferred embodiment of a display device according to the present invention will be described.

Figure 6:
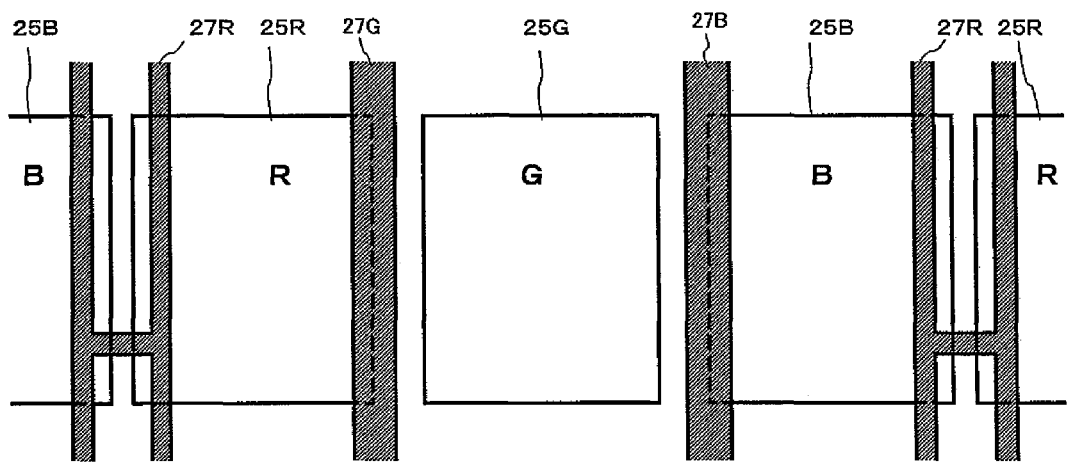
FIG. 6 is a plan view schematically illustrating color display pixels according to a fourth preferred embodiment of the present invention.

FIG. 6 schematically illustrates a set of color display pixels according to this fourth preferred embodiment. In FIG. 6, only the pixel electrodes 25 and the signal lines 27 are shown and the illustration of the scan lines 28 and the CF layer 33 is omitted.

As shown in FIG. 6, in this preferred embodiment, a double-line structure is applied to the red signal line 27R. But in the other respects, the arrangement of this preferred embodiment is identical with that of the first preferred embodiment described above. The center of the gap between the two lines of the red signal line 27R with the double-line structure agrees with that of the gap between the red pixel electrode 25R and the blue pixel electrode 27B. The gap between the green pixel electrode 25G and the green signal line 27G is wider than the gap between the red pixel electrode 25R and the green signal line 27G. And the gap between the green pixel electrode 25G and the blue signal line 27B is wider than the gap between the blue pixel electrode 25B and the blue signal line 27B. That is why the parasitic capacitances between the pixel electrodes and the signal lines satisfy:

$$Csd1(G) < Csd1(R), Csd2(R), Csd1(B), Csd2(B)$$

$$Csd2(G) < Csd1(B), Csd2(B), Csd1(R), Csd2(R)$$

Even with such an arrangement, the capacitance between the green pixel electrode 25G and its adjacent signal line can be smaller than the capacitance between a pixel electrode of any other color and its adjacent signal line. Consequently, the occurrence of the shadowing and interblock variation can be substantially prevented.

It should be noted that a signal line with such a double-line structure is less affected by a variation in parasitic capacitance Csd due to a misalignment that could occur during the manufacturing process of a display device than a signal line with a single line structure. In this preferred embodiment, signal lines with a single line structure, which will be easily affected by misalignment, are arranged on both sides of the green pixel electrode 25G. However, the parasitic capacitances between those signal lines and the green pixel electrode are too small to have a significant influence on a variation in the luminance of the color green.

The red pixel electrode 25R is interposed between two signal lines with mutually different shapes and so is the blue pixel electrode 25B. Still, when a dot inversion drive is carried out, Csd1=Csd2 is preferably satisfied.

When a dot inversion drive is performed, every color preferably satisfies Csd1=Csd2. In that case, the influences of Csd1 and Csd2 on the drain potential would cancel each other, thus preventing the occurrence of shadowing.

To stop the occurrence of the (vertical) shadowing and interblock variation, it seems to be effective to reduce the parasitic capacitance of every pixel. In that case, however, the gap between every signal line and its adjacent pixel electrode and the gap between the pixel electrodes would both widen, thus decreasing the aperture ratio and the transmittance significantly. In contrast, the liquid crystal display device of the fourth preferred embodiment described above can reduce the parasitic capacitance of only a color with high luminance that will have a lot of influence on the shadowing and interblock variation. As a result, the shadowing and interblock variation can be reduced effectively with the decrease in transmittance minimized.

In the preferred embodiment described above, both the green signal line 27G and the blue signal line 27B are supposed to have the single line structure. However, one of these two lines 27G and 27B may have the same double-line structure as the red signal line 27R.

Preferred Embodiment 5

Hereinafter, a fifth preferred embodiment of a display device according to the present invention will be described.

Figure 7A:
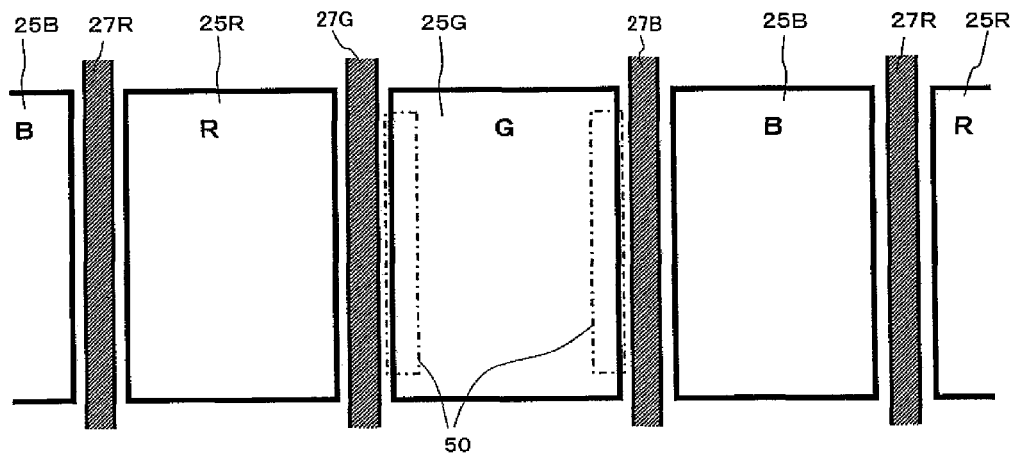

FIG. 7A is a plan view schematically illustrating a set of color display pixels according to this fifth preferred embodiment. As shown in FIG. 7A, the LCD of this preferred embodiment includes shield electrodes 50 that are arranged on both ends of the green pixel electrode 25G. As used herein, the "shield electrode" is a conductor that is arranged so as to either be located between a signal line and a pixel electrode or partially overlap with the pixel electrode. And the shield electrodes are formed simultaneously with the scan lines and the storage capacitor electrodes. The red, green and blue signal lines 27R, 27G and 27B are arranged such that their centers are located between the red and blue pixel electrodes 25R and 25B, between the green and red pixel electrodes 25G and 25R, and between the blue and green pixel electrodes 25B and 25G, respectively.

Figure 7B:
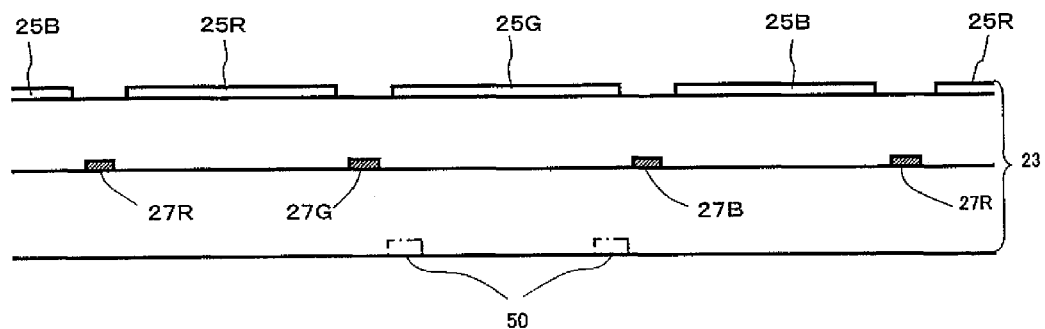

FIG. 7B is a cross-sectional view showing how the signal lines 27, the pixel electrodes 25, and the shield electrodes 50 shown in FIG. 7A look when viewed from the direction that is parallel to the surface of the substrate. When the active-matrix substrate 12 is viewed on this plane, the shield electrodes 50 are located under the layer where the signal lines 27 are arranged.

The capacitance Csd1(G) of the parasitic capacitor formed by the shield electrode between the green pixel electrode 25G and the green signal line 27G is smaller than the parasitic capacitance Csd1(R) between the red pixel electrode 25R and the red signal line 27R, for example. The parasitic capacitance Csd2(G) between the green pixel electrode 25G and the blue signal line 27B is smaller than the parasitic capacitance Csd2(B) between the blue pixel electrode 25B and the red signal line 27R, for example. Thus, as in the first preferred embodiment described above, the parasitic capacitances between the pixel electrodes and the signal lines satisfy:

$$Csd1(G) < Csd1(R), Csd1(B)$$

$$Csd2(G) < Csd2(B), Csd2(R)$$

Even with such an arrangement, the capacitance between the green pixel electrode 25G and its adjacent signal line can be smaller than the capacitance between a pixel electrode of any other color and its adjacent signal line. Consequently, the occurrence of the shadowing and interblock variation can be substantially prevented. Optionally, only one shield electrode 50 may be arranged on either end of the green pixel electrode 25G.

Hereinafter, a modified example of this preferred embodiment will be described.

Figure 8A:
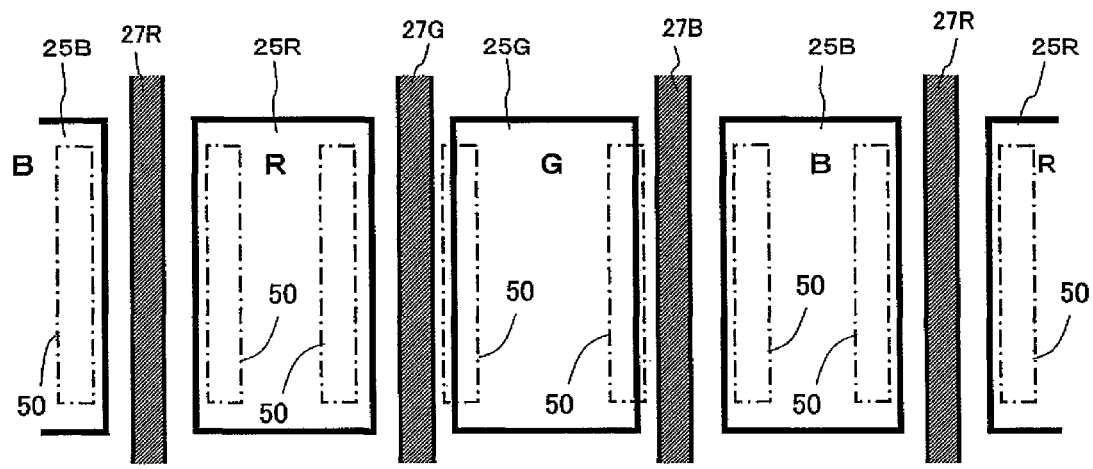

FIG. 8A is a plan view schematically illustrating a set of color display pixels according to a first modified example of this fifth preferred embodiment. As shown in FIG. 8A, in this modified example, the shield electrodes 50 are arranged on both ends of each of the red, green and blue pixel electrodes 25R, 25G and 25B. The respective shield electrodes 50 are located under the layer where the signal lines 27 are arranged as in the example of the fifth preferred embodiment described above.

In this modified example, the shield electrodes 50 arranged on both ends of the green pixel electrode 25G protrude from the green pixel electrode 25G as shown in FIG. 8A. However, the shield electrodes 50 arranged on both ends of the red pixel electrode 25R do not protrude from the red pixel electrode 25R. And the shield electrodes 50 arranged on both ends of the blue pixel electrode 25B do not protrude from the blue pixel electrode 25B, either.

Figure 8B:
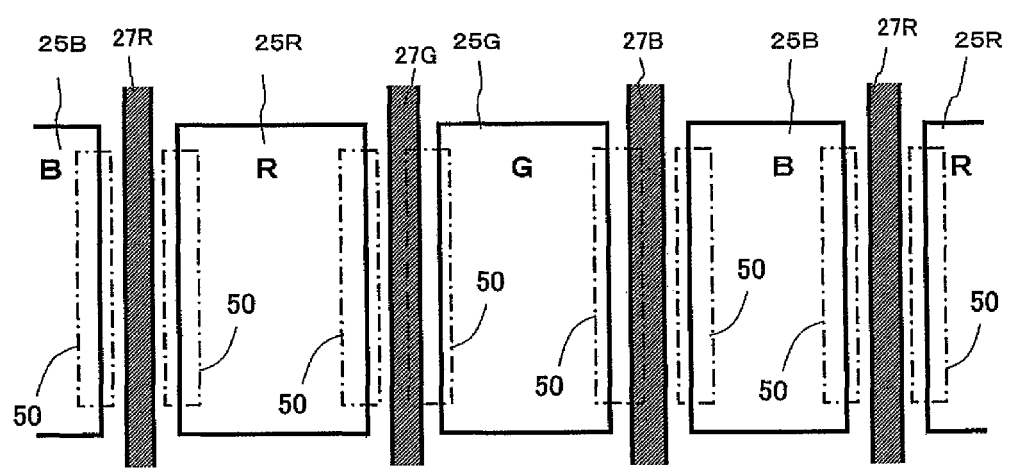

FIG. 8B is a plan view schematically illustrating a set of color display pixels according to a second modified example of this fifth preferred embodiment. As shown in FIG. 8B, in this modified example, the shield electrodes 50 arranged on both ends of the green pixel electrode 25G partially overlap with its adjacent green and blue signal lines 27G and 27B. On the other hand, the shield electrodes 50 arranged on both ends of the red pixel electrode 25R do not overlap with its adjacent signal lines. And neither do the shield electrodes 50 arranged on both ends of the blue pixel electrode 25B.

In the first and second modified examples, the parasitic capacitance Csd1(G) between the green pixel electrode 25G and the green signal line 27G is smaller than the parasitic capacitance Csd1(R) between the red pixel electrode 25R and the red signal line 27R, for example. The parasitic capacitance Csd2(G) between the green pixel electrode 25G and the blue signal line 27B is smaller than the parasitic capacitance Csd2(B) between the blue pixel electrode 25B and the red signal line 27R, for example. Thus, the parasitic capacitances between the pixel electrodes and the signal lines satisfy the same inequalities as those described for the fifth preferred embodiment.

Even in these modified examples, the capacitance between the green pixel electrode 25G and its adjacent signal line can be smaller than the capacitance between a pixel electrode of any other color and its adjacent signal line. Consequently, the occurrence of the shadowing and interblock variation can be substantially prevented.

When a dot inversion drive is performed, every color preferably satisfies Csd1=Csd2. In that case, the influences of Csd1 and Csd2 on the drain potential would cancel each other, thus preventing the occurrence of shadowing.

To stop the occurrence of the (vertical) shadowing and interblock variation, it seems to be effective to reduce the parasitic capacitance of every pixel. In that case, however, the capacitances of the signal lines would increase and the yield would decrease by arranging the shield electrodes as described for this fifth preferred embodiment or its modified examples. In contrast, the liquid crystal display device of this fifth preferred embodiment and its modified examples described above can reduce the parasitic capacitance of only a color with high luminance that will have a lot of influence on the shadowing and interblock variation. As a result, the shadowing and interblock variation can be reduced effectively with the increase in the capacitance of the signal lines and the decrease in yield minimized.

Preferred Embodiment 6

Hereinafter, a sixth preferred embodiment of a display device according to the present invention will be described.

Figure 9A:
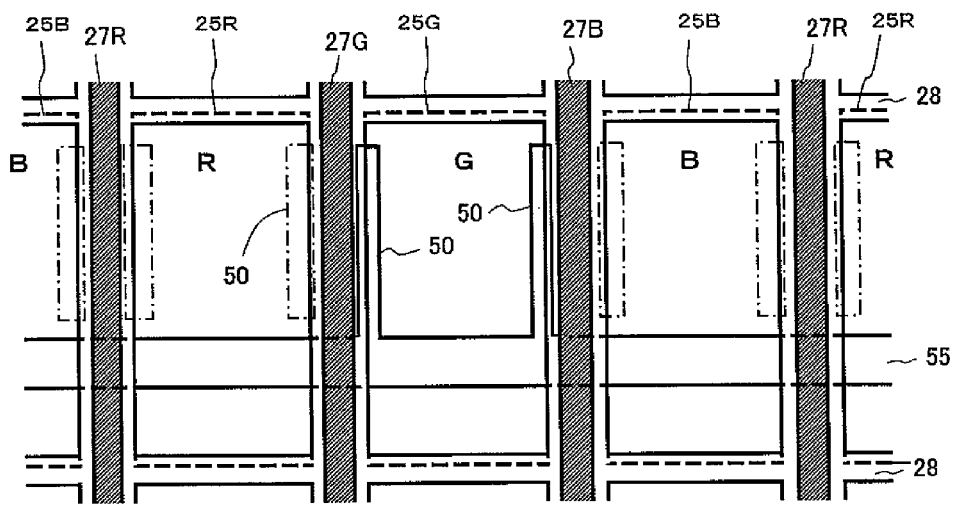

FIG. 9A is a plan view schematically illustrating a set of color display pixels according to this sixth preferred embodiment. As shown in FIG. 9A, in the LCD of this modified example, the storage capacitor electrodes 55 arranged on both ends of the green pixel electrode 25G are used as shield electrodes 50. On the other hand, the shield electrodes 50 arranged on both ends of the red pixel electrode 25R and on both ends of the blue pixel electrode 25B are isolated as islands. In this preferred embodiment, the shield electrodes 50 connected to the storage capacitor electrodes 55 are formed so as to run upward from the storage capacitor electrodes 55 (i.e., in a horn shape). Alternatively, those shield electrodes 50 may also run vertically in H-shape.

Figure 9B:
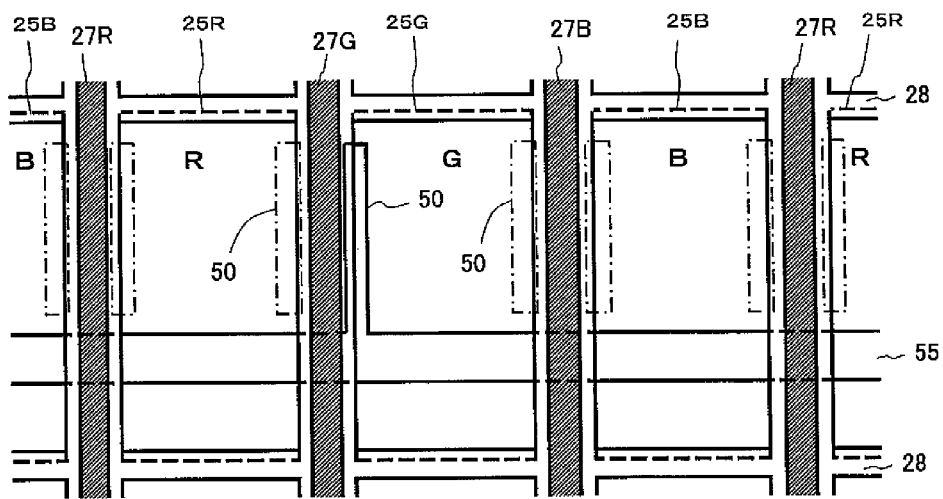

FIG. 9B is a plan view schematically illustrating a set of color display pixels according to a first modified example of the sixth preferred embodiment. As shown in FIG. 9B, only one of the two shield electrode 50 on one side of the green pixel electrode 25G is connected to the storage capacitor electrode 55, while the other shield electrode 50 is isolated just like the counterparts of the pixel electrodes of the other colors. In this preferred embodiment, the shield electrode 50 connected to the storage capacitor electrode 55 on that side of the green pixel electrode 25G is also formed so as to run upward from the storage capacitor electrode 55 (i.e., in a horn shape). Alternatively, the shield electrode 50 may also run vertically.

Figure 9C:
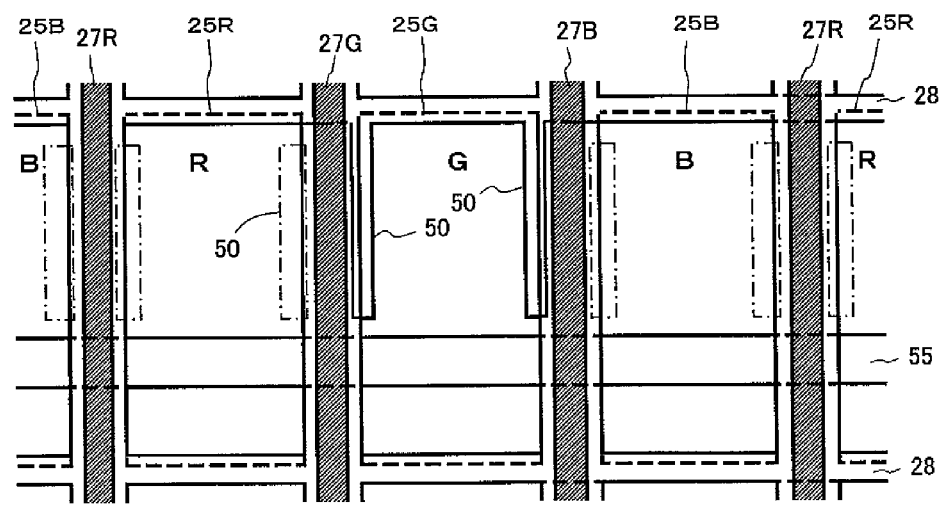

FIG. 9A is a plan view schematically illustrating a set of color display pixels according to a second modified example of the sixth preferred embodiment. In the sixth preferred embodiment, the storage capacitor electrodes 55 are used as the shield electrodes 50. In this modified example, however, the scan lines 28 are used as the shield electrodes 50 as shown in FIG. 9C.

In the sixth preferred embodiment and its first and second modified examples described above, the shield electrodes 50, storage capacitor electrodes 55 or extended portions of the scan lines 28 are arranged between the green pixel electrode 25G and the green or blue signal line 27G or 27B. Thus, the parasitic capacitance Csd1(G) between the green pixel electrode 25G and the green signal line 27G is smaller than the parasitic capacitance Csd1(R) between the red pixel electrode 25R and the red signal line 27R, for example. The parasitic capacitance Csd2(G) between the green pixel electrode 25G and the blue signal line 27B is smaller than the parasitic capacitance Csd2(B) between the blue pixel electrode 25B and the red signal line 27R, for example. Thus, the parasitic capacitances between the pixel electrodes and the signal lines satisfy the same inequalities as the ones described for the first preferred embodiment.

Thus, the capacitance between the green pixel electrode 25G and its adjacent signal line can be smaller than the capacitance between a pixel electrode of any other color and its adjacent signal line. Consequently, the occurrence of the shadowing and interblock variation can be substantially prevented.

When a dot inversion drive is performed, every color preferably satisfies Csd1=Csd2. In that case, the influences of Csd1 and Csd2 on the drain potential would cancel each other, thus preventing the occurrence of shadowing.

To stop the occurrence of the (vertical) shadowing and interblock variation, it seems to be effective to reduce the parasitic capacitance of every pixel. In that case, however, the capacitances of the signal lines would increase and the yield would decrease for the following reasons.

Specifically, if a shield electrode 50 is connected to the scan line 28 or the storage capacitor electrode 55, then a stabilized potential is supplied to the shield electrode 50, thus increasing the capacitance of the signal line compared to a situation where the shield electrode is isolated as an island. That is why if the shield electrodes of all pixels were connected to the scan lines, for example, to reduce the parasitic capacitance of the pixel in every color, then the signal lines would have huge capacitance overall. However, according to the preferred embodiment that uses the shield electrodes 50, the electrodes 50 are connected to the scan lines 28 or the storage capacitor electrodes 55 only in the pixels in a color that has high luminance. As a result, the capacitance of the signal lines that are adjacent to the other pixels can be kept small.

Meanwhile, if a shield electrode 50 cannot be connected to the scan lines 28 or the storage capacitor electrodes 55, no signal will be supplied to the shield electrode 50. In that case, even if leakage current were produced between the shield electrode 50 and any other site, that would not be a serious problem and the production yield would still increase. However, if the shield electrode 50 is connected to the scan lines 28 or the storage capacitor electrodes 55, then the leakage will be a serious problem and the yield will drop. That is why if the shield electrodes of all pixels were connected to the scan lines, for example, to reduce the parasitic capacitance of the pixel in every color, then the yield would decrease significantly. However, according to the preferred embodiment that uses the shield electrodes 50, the electrodes 50 are connected to the scan lines 28 or the storage capacitor electrodes 55 only in the pixels in a color that has high luminance. As a result, a high yield can be maintained for the other pixels.

In contrast, the liquid crystal display device of this sixth preferred embodiment and its modified examples described above can reduce the parasitic capacitance of only a color with high luminance that will have a lot of influence on the shadowing and interblock variation. As a result, the shadowing and interblock variation can be reduced effectively with the increase in the capacitance of the signal lines and the decrease in yield minimized.

Preferred Embodiment 7

Hereinafter, a seventh preferred embodiment of a display device according to the present invention will be described.

In the LCD of this seventh preferred embodiment, each set of color display pixels in the three primary colors for the LCD shown in FIGS. 1 and 2 is replaced with a set of color display pixels in the four colors of red, green, blue and white. The white pixel of the seventh preferred embodiment has the same configuration (including the arrangement of the CFs, BM, signal lines and scan lines) as the green pixel of the first preferred embodiment described above. And the red, green and blue pixels of the seventh preferred embodiment have the same configuration as the red and blue pixels of the first preferred embodiment.

Figure 10:
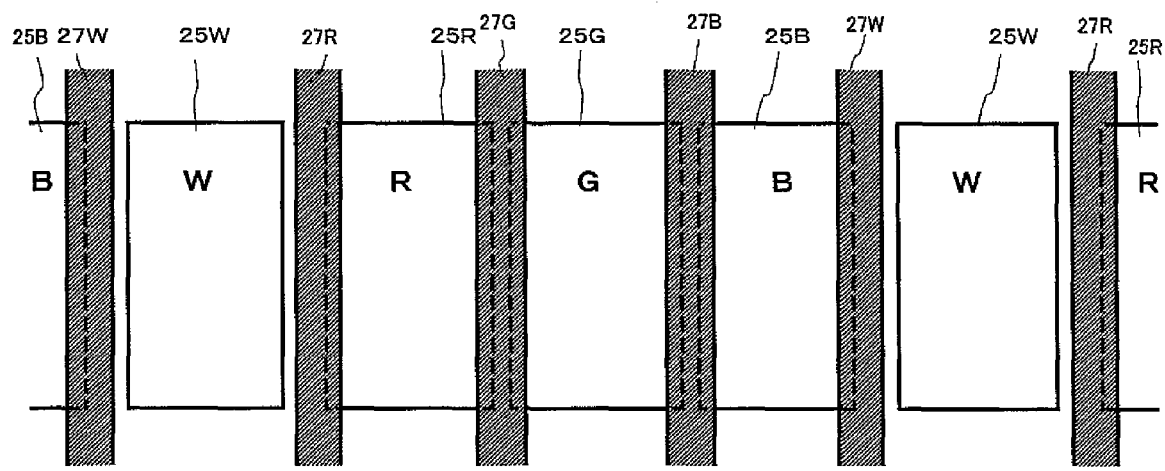
FIG. 10 is a plan view schematically illustrating color display pixels according to a seventh preferred embodiment of the present invention.

FIG. 10 schematically illustrates the arrangement of color display pixels according to this seventh preferred embodiment. In FIG. 10, only the pixel electrodes 25 and the signal lines 27 are shown and the illustration of the scan lines 28 and the CF layer 33 is omitted.

As shown in FIG. 10, each set of color display pixels of this seventh preferred embodiment includes a red pixel electrode 25R, a green pixel electrode 25G, a blue pixel electrode 25B, a white pixel electrode 25W, a red signal line 27R, a green signal line 27G, a blue signal line 27B and a white signal line 27W. The white signal line 27W is arranged such that at least a portion of the signal line 27W runs between the white pixel electrode 25W and the blue pixel electrode 25B. The red signal line 27R is arranged such that at least a portion of the signal line 27R runs between the red pixel electrode 25R and the white pixel electrode 25W. The green signal line 27G is arranged such that its centerline is located at the middle of the gap between the green and red pixel electrodes 25G and 25R. And the blue signal line 27B is arranged such that its centerline is located at the middle of the gap between the blue and green pixel electrodes 25B and 25G.

The gap between the white pixel electrode 25W and the white signal line 27W is wider than the gap between the blue pixel electrode 25B and the white signal line 27W. And the gap between the white pixel electrode 25W and the red signal line 27R is wider than the gap between the red pixel electrode 25R and the red signal line 27R. In this manner, by leaving a wider gap between the white pixel electrode 25W and its adjacent white and red signal lines 27W and 27R than the one between the pixel electrode 25 of any other color and its adjacent signal line 27, the parasitic capacitance $Csd1(W)$ between the white pixel electrode 25W and the white signal line 27W can be smaller than the parasitic capacitance $Csd1(B)$ between the blue pixel electrode 25B and the blue signal line 27B, for example.

The parasitic capacitance $Csd1(W)$ and the other parasitic capacitances Csd satisfy:

$$Csd1(W) < Csd1(R), Csd1(G), Csd1(B)$$

Also, the parasitic capacitance $Csd2(W)$ between the white pixel electrode 25W and the red signal line 27R and the other parasitic capacitances Csd satisfy:

$$Csd2(W) < Csd2(R), Csd2(G), Csd2(B)$$

Thus, the parasitic capacitance Csd between the white pixel electrode 25W and one of its adjacent signal lines 27 becomes smaller than the parasitic capacitance Csd between a pixel electrode of any other color and one of its adjacent signal line. That is why when an image is presented, the potential (i.e., the drain potential Vd) at the white pixel electrode 25W is affected less by the parasitic capacitance Csd than the red, green or blue pixel electrode 25R, 25G or 25B is. As a result, the variation $\Delta Vsd$ in drain potential due to the parasitic capacitance Csd can be reduced significantly.

Among the four colors of white, red, green and blue, white has a greater Y value than any other color according to the XYZ color system. By adopting the configuration described above, the variation in the lightness of the color white, which has a higher degree of lightness (i.e., a greater Y value or less hue) than any other color in the R, G, B and W to be represented, can be smaller than the variation in the lightness of any other color. As a result, a display operation can be performed with the shadowing phenomenon or the interblock variation either rarely allowed to occur or suppressed to a hardly noticeable level, if ever.

The configuration of the green pixel according to any of the first through sixth preferred embodiments of the present invention and their modified examples described above is applicable to the white pixel of this preferred embodiment. Also, the configuration of the red and blue pixels according to any of the first through sixth preferred embodiments of the present invention and their modified examples described above is applicable to the red, green and blue pixels of this preferred embodiment.

According to another modified example of this preferred embodiment, the parasitic capacitances $Csd(W)$, $Csd(G)$, $Csd(R)$ and $Csd(B)$ of the white, green, red and blue pixels may satisfy the following relation:

$$Csd(W) \leq Csd(G) \leq Csd(R), Csd(B)$$

or $$Csd(W) \leq Csd(G) \leq Csd(R) \leq Csd(B)$$

Among the four colors of white, red, green and blue, the color green has the second highest Y value (or degree of lightness) and the color red has the third highest Y value. That is why according to this modified example, the parasitic capacitance Csd of the color with the higher Y value can be reduced more significantly. As a result, a display device that has a great aperture ratio and that rarely produces the shadowing or interblock variation is realized. It should be noted that the white, red, green and blue pixels do not have to be arranged as shown in FIG. 10 but may also be arranged in any other order.

Figure 15:
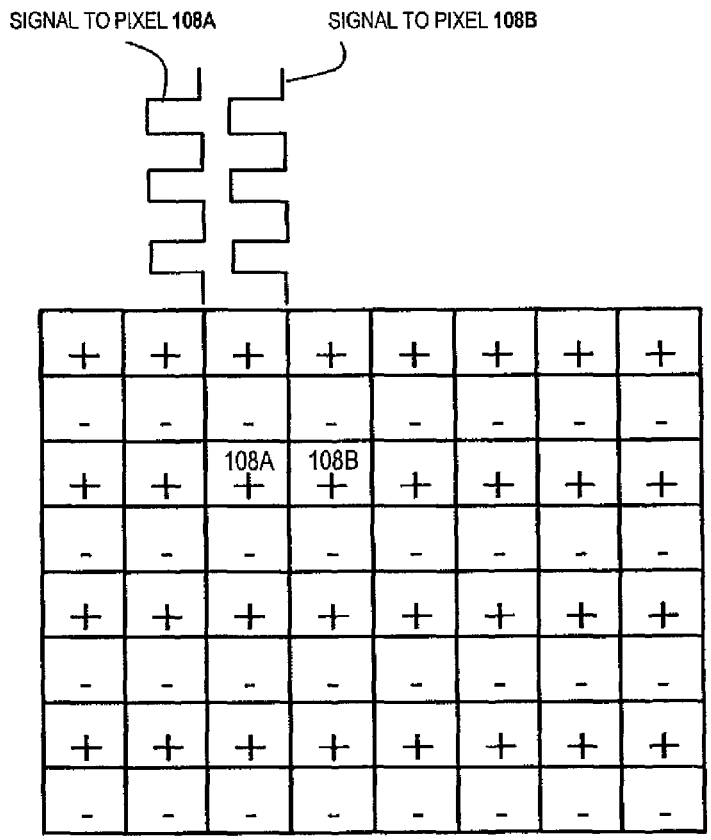
FIG. 15 shows the polarities of display signals to be supplied to a display device by a line inversion drive.
Figure 16:
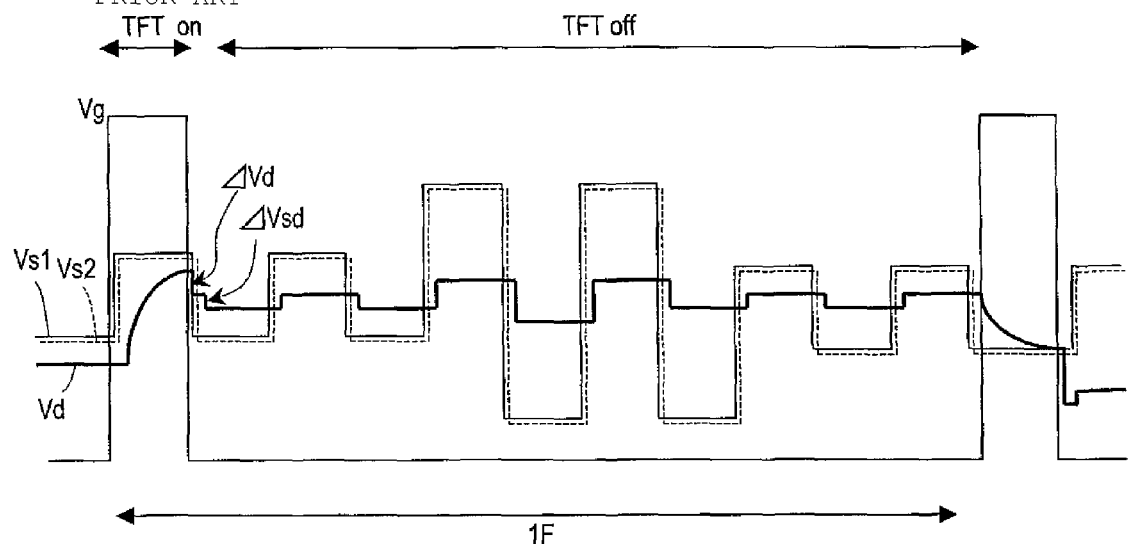
FIG. 16 shows how the potential at a pixel electrode changes when a line inversion drive is performed.
Figures 17, 18:
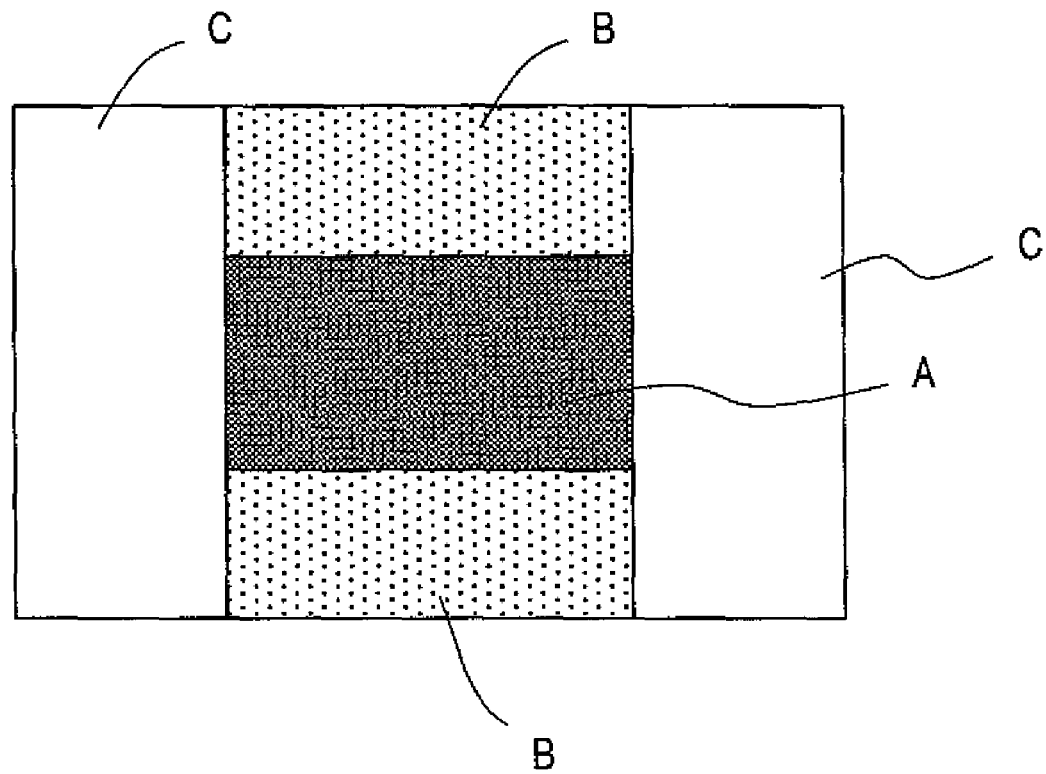
FIG. 17 shows how shadowing occurs.
FIG. 18 shows the polarities of display signals to be supplied to a conventional display device by a dot inversion drive.

Next, a special type of polarity inversion drive that can be used in this seventh preferred embodiment will be described. That special type of polarity inversion drive is different from the line inversion drive that has been described with reference to FIG. 15 and from the dot inversion drive that has been described with reference to FIG. 18. It should be noted that an invention relating to a display device that adopts the special type of polarity inversion drive is disclosed in detail in Japanese Patent Application No. 2005-344914, which was filed by the applicant of the present application.

Figure 11A:
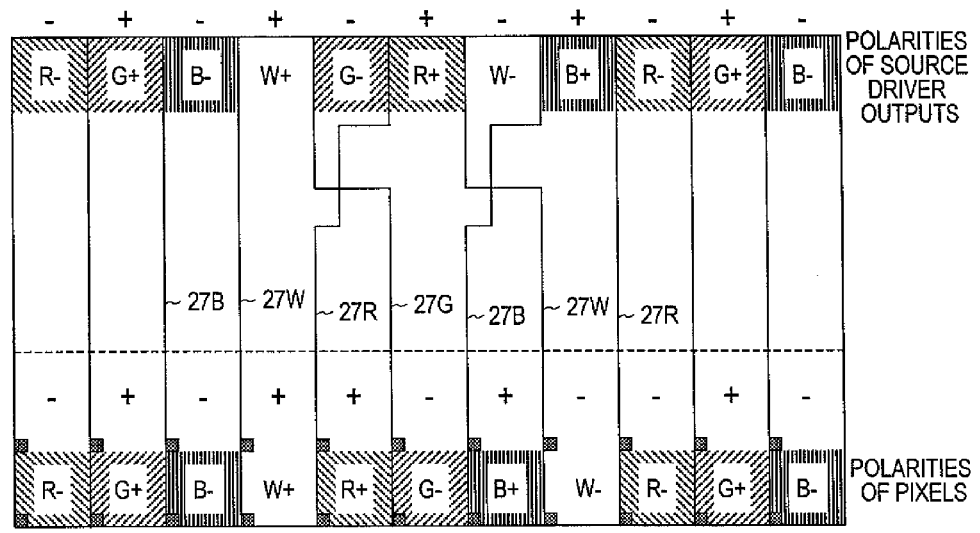
Figure 11B:
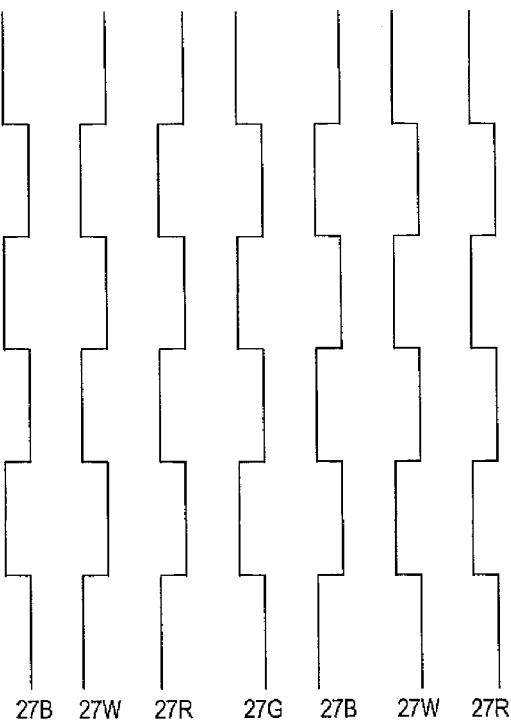

FIG. 11A shows how to perform that special type of polarity inversion drive and FIG. 11B shows the polarities of signals supplied to the respective signal lines 27. In performing that special type of polarity inversion drive, signals with alternating polarities are supplied from a source driver (i.e., a signal driver) to the respective signal lines 27 so as to change their polarities on a line-by-line basis as shown in the upper portion of FIG. 11A. In other words, when leaving the source driver, signals with mutually opposite polarities are supplied to any arbitrary pair of adjacent signal lines. This method of supplying signals is the same as that of a conventional dot inversion drive, and therefore, a circuit used in the dot inversion drive may be used as the source driver.

However, some of the signal lines 27 are arranged so as to cross each other between the source driver and the display area. As a result, in the display area, signals with the same polarity are supplied to each white signal line 27W and its adjacent red signal line 27R. Meanwhile, signals with mutually opposite polarities are supplied to each white signal line 27W and its adjacent blue signal line 27B, to each blue signal line 27B and its adjacent green signal line 27G, and to each green signal line 27G and its adjacent red signal line 27R.

That is why signals with mutually opposite polarities are supplied to two signal lines that are adjacent to the red, green or blue pixel electrode 25R, 25G or 25B. As a result, the shadowing rarely occurs at a red, green or blue pixel. On the other hand, since signals with the same polarity are supplied to two signal lines that are adjacent to the white pixel electrode 25W, a white pixel could cause the shadowing phenomenon. Nevertheless, according to this seventh preferred embodiment, the parasitic capacitance Csd(W) of the white pixel electrode 25W is so small that the shadowing rarely occurs at the white pixel electrode, too. On top of that, since the parasitic capacitance Csd(W) is small, the interblock variation does not occur often, either.

Consequently, by applying that special type of polarity inversion drive to the seventh preferred embodiment, a display device, in which the shadowing or interblock variation rarely occurs, is realized.

Thus, the seventh preferred embodiment of the present invention and its modified example described above provide an LCD that has a high aperture ratio and that can display an image of high quality with the shadowing or interblock variation allowed to occur rarely.

When a dot inversion drive is performed, every color preferably satisfies Csd1=Csd2. In that case, the influences of Csd1 and Csd2 on the drain potential would cancel each other, thus preventing the occurrence of shadowing.

To stop the occurrence of the (vertical) shadowing and interblock variation, it seems to be effective to reduce the parasitic capacitance of every pixel. In that case, however, the aperture ratio and the transmittance would both decrease significantly. In contrast, the liquid crystal display device of the seventh preferred embodiment described above can reduce the parasitic capacitance of only a color with high luminance that will have a lot of influence on the shadowing and interblock variation. As a result, the shadowing and interblock variation can be reduced effectively with the decrease in transmittance minimized.

Preferred Embodiment 8

Hereinafter, an eighth preferred embodiment of a display device according to the present invention will be described.

In an LCD according to an eighth preferred embodiment of the present invention, each unit of color display pixels in the four colors of red, green, blue and white of the seventh preferred embodiment described above is replaced with a unit of color display pixels in the four colors of red (R), green (G), blue (B) and yellow (Y). The configuration of the yellow pixel of this preferred embodiment is the same as that of the white pixel of the seventh preferred embodiment (including the arrangements of CFs, BM, signal lines and scan lines). And the red, green and blue pixels of this preferred embodiment have the same configurations as the counterparts of the seventh preferred embodiment described above. Other than that, this preferred embodiment is identical with the seventh preferred embodiment described above.

Alternatively, another LCD according to the eighth preferred embodiment of the present invention may use a unit of color display pixels in the five colors of red (R), green (G), blue (B), cyan (C) and yellow (Y). Even so, the configuration of the yellow pixel of this preferred embodiment is the same as that of the white pixel of the seventh preferred embodiment (including the arrangements of CFs, BM, signal lines and scan lines). And the red, green, blue and cyan pixels of this preferred embodiment have the same configurations as the red, green, and blue pixels of the seventh preferred embodiment described above. Other than that, this preferred embodiment is identical with the seventh preferred embodiment described above.

Still alternatively, still another LCD according to the eighth preferred embodiment of the present invention may use a unit of color display pixels in the six colors of red (R), green (G), blue (B), cyan (C), magenta (M) and yellow (Y). Even so, the configuration of the yellow pixel of this preferred embodiment is the same as that of the white pixel of the seventh preferred embodiment (including the arrangements of CFs, BM, signal lines and scan lines). And the red, green, blue, cyan and magenta pixels of this preferred embodiment have the same configurations as the red, green, and blue pixels of the seventh preferred embodiment described above. Other than that, this preferred embodiment is identical with the seventh preferred embodiment described above.

The single-color luminances (or the Y values) of these six colors and white—seven colors in total—decrease in the order of white (W), yellow (Y), cyan (C), green (G), magenta (M), red (R) and blue (B). According to the seventh preferred embodiment, adjustments are made such that in each set of color display pixels in the four to six colors, a pixel of the color with the highest luminance (i.e., white pixel in the seventh preferred embodiment) has the smallest parasitic capacitance. Thus, the variation in the lightness of the color white can be smaller than the variation in the lightness of any other color. As a result, a display operation can be performed with the shadowing phenomenon or the interblock variation either rarely allowed to occur or suppressed to a hardly noticeable level, if ever.

The configuration of the green pixel according to any of the first through sixth preferred embodiments of the present invention and their modified examples described above and the configuration according to the seventh preferred embodiment and its modified examples are applicable to the yellow pixel of this preferred embodiment. Also, the configuration of the red and blue pixels according to any of the first through sixth preferred embodiments of the present invention and their modified examples described above and the configuration of the non-yellow pixels of the seventh preferred embodiment and its modified examples are applicable to the non-yellow pixels of this preferred embodiment.

In this preferred embodiment, when a dot inversion drive is performed, every color preferably satisfies Csd1=Csd2, too. In that case, the influences of Csd1 and Csd2 on the drain potential would cancel each other, thus preventing the occurrence of shadowing.

To stop the occurrence of the (vertical) shadowing and interblock variation, it seems to be effective to reduce the parasitic capacitance of every pixel. In that case, however, the aperture ratio and the transmittance would both decrease significantly. In contrast, the liquid crystal display device of the eighth preferred embodiment described above can reduce the parasitic capacitance of only a color with high luminance that will have a lot of influence on the shadowing and interblock variation. As a result, the shadowing and interblock variation can be reduced effectively with the decrease in transmittance minimized.

Figure 12A:
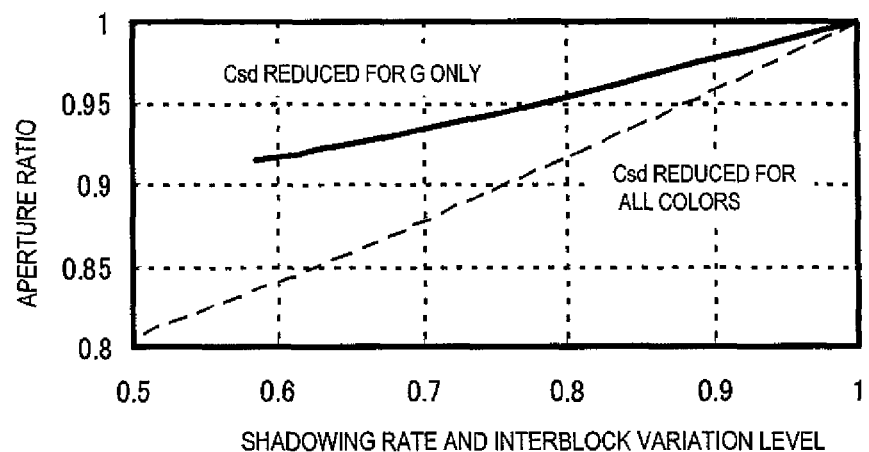
Figure 12B:
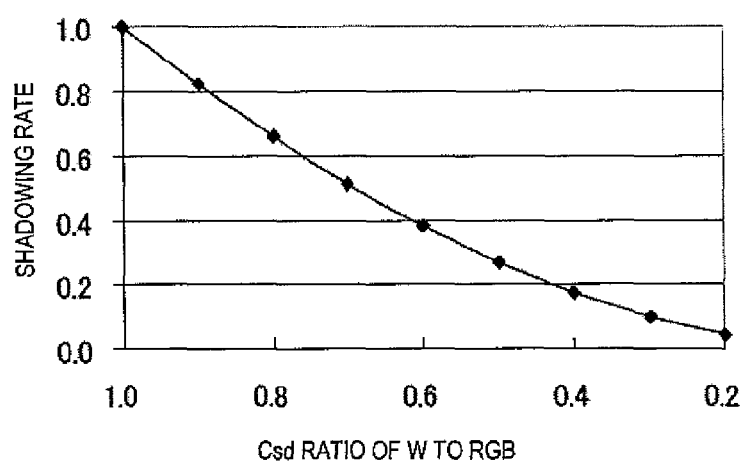
Figure 13:
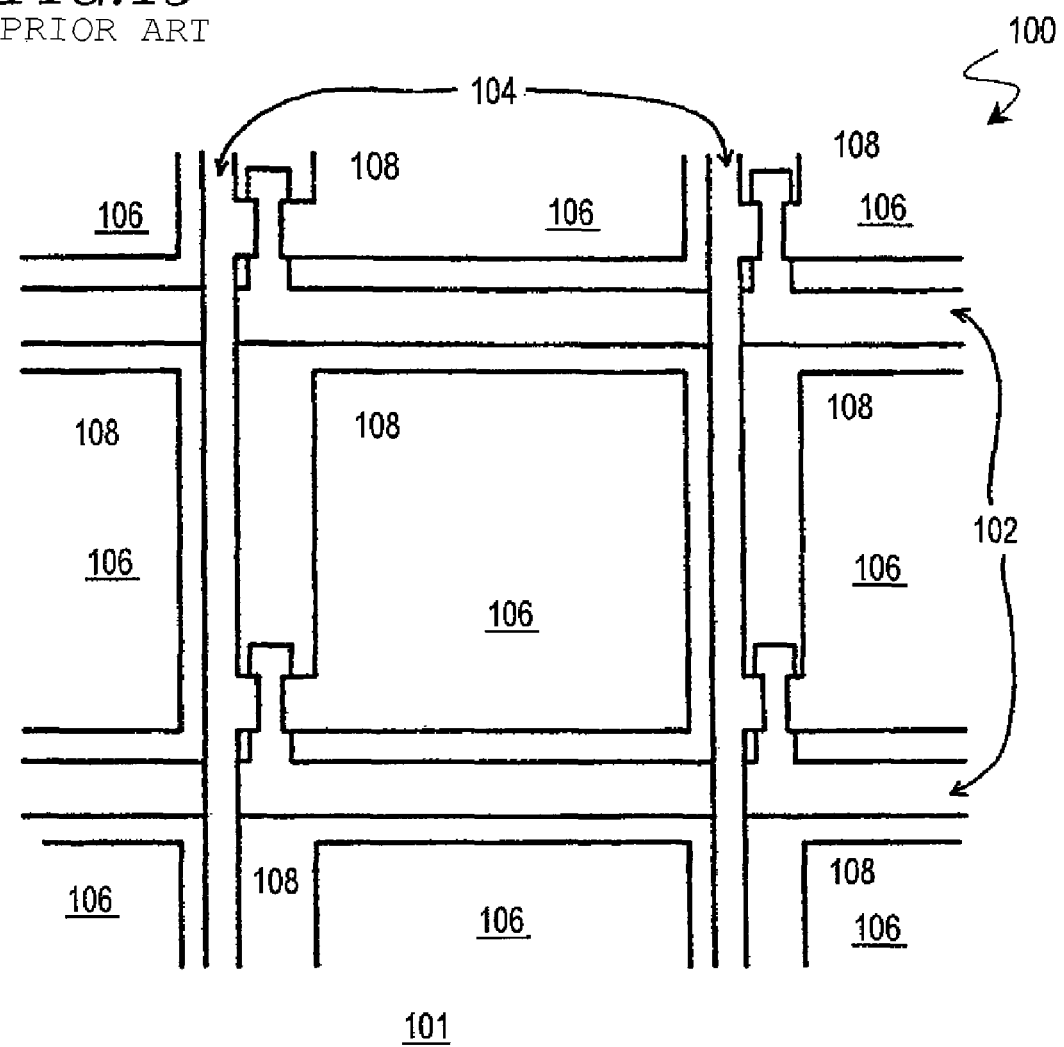
FIG. 13 is a plan view illustrating a portion of an active-matrix substrate for a display device.
Figure 14:
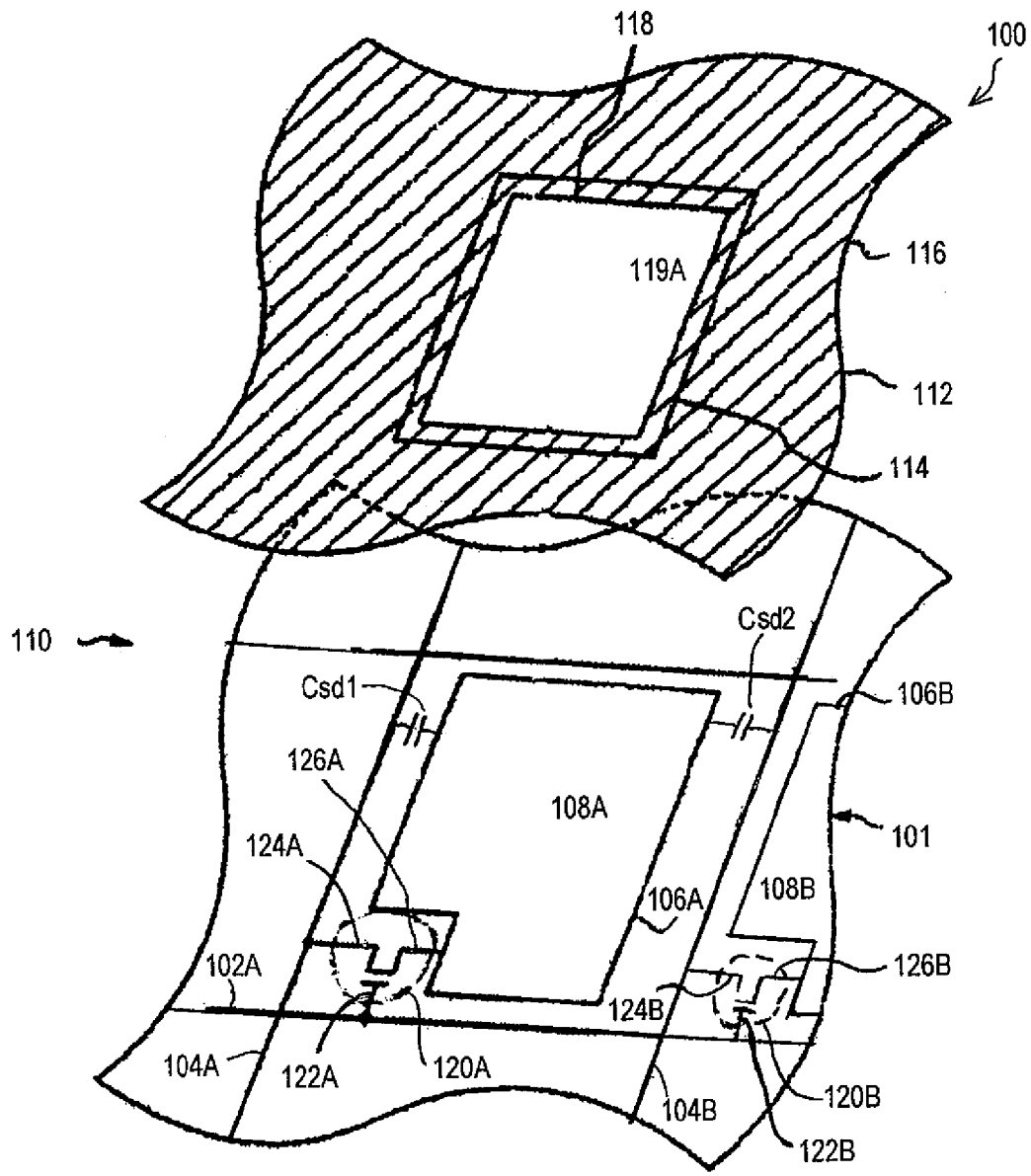
FIG. 14 illustrates the configuration of a single pixel in the display area of a display device.

FIGS. 12A and 12B show the effects achieved by the preferred embodiments of the present invention and their modified examples described above.

Specifically, FIG. 12A is a graph showing how the aperture ratio changes in a situation where Csd is reduced for all of the RGB color pixels of an LCD and in a situation where Csd is reduced for only the green pixel thereof. In this graph, the abscissa represents the shadowing rate when the line inversion drive is conducted and the ratio at which the interblock variation level changes before and after Csd is reduced and when the dot inversion drive is performed, while the ordinate represents the ratio at which the aperture ratio changes before and after Csd is reduced. As shown in FIG. 12A, at the same shadowing rate or at the same interblock variation level, the higher aperture ratio is achieved by reducing Csd for only the green pixel.

FIG. 12B is a graph showing how the shadowing level changes in a situation where the special type of polarity inversion drive described above is applied to an LCD including RGBW pixels. In FIG. 12B, the abscissa represents the ratio of Csd(W) to Csd(R), Csd(G) or Csd(B), while the ordinate represents the shadowing rate, which is the ratio calculated with respect to a shadowing level in a situation where the Csd values of RGBW pixels are all substantially equal to each other. In this example, the Csd values of the red, blue and green pixels are supposed to be substantially equal to each other. As can be seen from FIG. 12(b), by reducing only the parasitic capacitance Csd(W) of the white pixel electrode with respect to the parasitic capacitance Csd(R), Csd(B) or Csd(G) of the red, blue or green pixel electrode, the shadowing level can be decreased steeply.

In the foregoing description, an SHA type LCD panel has been described as an exemplary display device. However, a display device according to the present invention does not have to be the SHA type LCD but may also be any other type of LCD operating in an ASM mode, an MVA mode or an IPS mode, for example. Besides, the display device of the present invention does not have to be an LCD or a TFT display device, either. Rather the display device of the present invention may be any other type of display device as long as the voltage retained at a pixel electrode is affected by parasitic capacitance Csd between that pixel electrode and a line.

Various preferred embodiments of the present invention provides a display device that ensures high display quality. A display device according to a preferred embodiment of the present invention can be used effectively as any of various types of display devices. For example, various preferred embodiments of the present invention are effectively applicable to a display device that performs a polarity inversion drive using a switching element for each pixel as in an LCD or an organic EL display.

While preferred embodiments of the present invention have been described above, it is to be understood that variations and modifications will be apparent to those skilled in the art without departing the scope and spirit of the present invention. The scope of the present invention, therefore, is to be determined solely by the following claims.

The invention claimed is:

1. A display device with multiple pixels, the display device comprising:
   multiple pixel electrodes, which are provided for the respective pixels; and
   multiple signal lines, which are connected to the pixel electrodes via respective switching elements; wherein
   the pixel electrodes include a first pixel electrode and a second pixel electrode; and
   the signal lines include a first signal line connected to the first pixel electrode and a second signal line connected to the second pixel electrode; and
   the distance between one end of the first pixel electrode and the centerline of the first signal line is greater than the distance between one end of the second pixel electrode and the centerline of the second signal line; or
   a distance between the other end of the first pixel electrode and the centerline of an adjacent signal line, which is located on the opposite side of the first pixel electrode from the first signal line, is greater than a distance between the other end of the second pixel electrode and the centerline of another adjacent signal line, which is located on the opposite side of the second pixel electrode from the second signal line.

2. The display device of claim 1, wherein the multiple pixels include pixels to represent multiple different colors, and wherein according to an XYZ color system, the first pixel electrode has a greater Y value than the second pixel electrode.

3. The display device of claim 1, wherein the aperture ratio of the pixel including the first pixel electrode is substantially equal to that of the pixel including the second pixel electrode.

4. The display device of claim 1, wherein the multiple pixels include pixels to represent multiple different colors, and wherein one repeat unit of the multiple colors includes the first and second pixel electrodes.

5. The display device of claim 4, wherein according to an XYZ color system, the first pixel electrode has a greater Y value than the second pixel electrode.

6. The display device of claim 4, wherein in each said repeat unit of the multiple colors, the aperture ratios of all pixels are substantially equal to each other.

7. The display device of claim 4, wherein each said repeat unit of the multiple colors includes two types of pixel structures, the pixel structures include a first pixel structure associated with the first pixel electrode, and the color represented by the pixel with the first pixel structure is only one of the multiple colors that form the repeat unit.

8. The display device of claim 7, wherein the pixel with the first pixel structure represents one of the multiple colors that has the largest Y value according to the XYZ color system.

9. The display device of claim 7, wherein a first black matrix, having a predetermined width and running in the same direction as the first signal line, is arranged over the first signal line and a second black matrix, having a predetermined width and running in the same direction as the second signal line, is arranged over the second signal line, and supposing the distance between the centerline of the first signal line and one end of the first black matrix closer to the first pixel electrode is identified by D1(1), the distance between the centerline of the second signal line and one end of the second black matrix closer to the second pixel electrode is identified by D1(2), the distance between the centerline of an adjacent signal line, which is located on the opposite side of the first pixel electrode from the first signal line, and one end of an adjacent black matrix, which is located on the opposite side of the first pixel electrode from the first black matrix, on the side closer to the first pixel electrode, is identified by D2(1), and the distance between the centerline of another adjacent signal line, which is located on the opposite side of the second pixel electrode from the second signal line, and one end of another adjacent black matrix, which is located on the opposite side of the second pixel electrode from the second black matrix, on the side closer to the second pixel electrode, is identified by D2(2), either D1(1)>D1(2) or D2(1)>D2(2) is satisfied.

10. The display device of claim 4, wherein each said repeat unit of the multiple colors includes two types of pixel structures, the pixel structures include a first pixel structure associated with the first pixel electrode and a second pixel structure associated with the second pixel electrode, and the colors represented by the pixel with the first pixel structure are two or more of the multiple colors that form the repeat unit.

11. The display device of claim 10, wherein the pixel with the first pixel structure represents one of the multiple colors that has the largest Y value according to the XYZ color system.

12. The display device of claim 10, wherein a first black matrix, having a predetermined width and running in the same direction as the first signal line, is arranged over the first signal line and a second black matrix, having a predetermined width and running in the same direction as the second signal line, is arranged over the second signal line, and supposing the distance between the centerline of the first signal line and one end of the first black matrix closer to the first pixel electrode is identified by D1(1), the distance between the centerline of the second signal line and one end of the second black matrix closer to the second pixel electrode is identified by D1(2), the distance between the centerline of an adjacent signal line, which is located on the opposite side of the first pixel electrode from the first signal line, and one end of an adjacent black matrix, which is located on the opposite side of the first pixel electrode from the first black matrix, on the side closer to the first pixel electrode, is identified by D2(1), and the distance between the centerline of another adjacent signal line, which is located on the opposite side of the second pixel electrode from the second signal line, and one end of another adjacent black matrix, which is located on the opposite side of the second pixel electrode from the second black matrix, on the side closer to the second pixel electrode, is identified by D2(2), either D1(1)>D1(2) or D2(1)>D2(2) is satisfied.

13. A display device with multiple pixels, the display device comprising:

multiple pixel electrodes, which are provided for the respective pixels; and
multiple signal lines, which are connected to the pixel electrodes via respective switching elements; wherein
the pixel electrodes include a first pixel electrode and a second pixel electrode; and
the signal lines include a first signal line connected to the first pixel electrode and a second signal line connected to the second pixel electrode; and
a shield electrode is arranged under a portion of the first pixel electrode closer to the first signal line but no shield electrode is arranged under a portion of the second pixel electrode closer to the second signal line; or
a shield electrode is arranged under a portion of the first pixel electrode closer to an adjacent signal line, which is located on the opposite side of the first pixel electrode from the first signal line, but no shield electrode is arranged under a portion of the second pixel electrode closer to another adjacent signal line, which is located on the opposite side of the second pixel electrode from the second signal line.

14. The display device of claim 13, wherein the multiple pixels include pixels to represent multiple different colors, and wherein according to an XYZ color system, the first pixel electrode has a greater Y value than the second pixel electrode.

15. The display device of claim 13, wherein the aperture ratio of the pixel including the first pixel electrode is substantially equal to that of the pixel including the second pixel electrode.

16. The display device of claim 13, wherein the multiple pixels include pixels to represent multiple different colors, and wherein one repeat unit of those multiple colors includes the first and second pixel electrodes.

17. The display device of claim 16, wherein according to an XYZ color system, the first pixel electrode has a greater Y value than the second pixel electrode.

18. The display device of claim 16, wherein in each said repeat unit of the multiple colors, the aperture ratios of all pixels are substantially equal to each other.

19. The display device of claim 16, wherein each said repeat unit of the multiple colors includes two types of pixel structures, the pixel structures include a first pixel structure associated with the first pixel electrode, and the color represented by the pixel with the first pixel structure is only one of the multiple colors that form the repeat unit.

20. The display device of claim 19, wherein the pixel with the first pixel structure represents one of the multiple colors that has the largest Y value according to the XYZ color system.

21. The display device of claim 19, wherein a first black matrix, having a predetermined width and running in the same direction as the first signal line, is arranged over the first signal line and a second black matrix, having a predetermined width and running in the same direction as the second signal line, is arranged over the second signal line, and supposing the distance between the centerline of the first signal line and one end of the first black matrix closer to the first pixel electrode is identified by D1(1), the distance between the centerline of the second signal line and one end of the second black matrix closer to the second pixel electrode is identified by D1(2), the distance between the centerline of an adjacent signal line, which is located on the opposite side of the first pixel electrode from the first signal line, and one end of an adjacent black matrix, which is located on the opposite side of the first pixel electrode from the first black matrix, on the side closer to the first pixel electrode, is identified by D2(1), and the distance between the centerline of another adjacent signal line, which is located on the opposite side of the second pixel electrode from the second signal line, and one end of another adjacent black matrix, which is located on the opposite side of the second pixel electrode from the second black matrix, on the side closer to the second pixel electrode, is identified by D2(2), either D1(1)>D1(2) or D2(1)>D2(2) is satisfied.

22. The display device of claim 16, wherein each said repeat unit of the multiple colors includes two types of pixel structures, the pixel structures include a first pixel structure associated with the first pixel electrode and a second pixel structure associated with the second pixel electrode, and the colors represented by the pixel with the first pixel structure are two or more of the multiple colors that form the repeat unit.

23. The display device of claim 22, wherein the pixel with the first pixel structure represents one of the multiple colors that has the largest Y value according to the XYZ color system.

24. The display device of claim 22, wherein a first black matrix, having a predetermined width and running in the same direction as the first signal line, is arranged over the first signal line and a second black matrix, having a predetermined width and running in the same direction as the second signal line, is arranged over the second signal line, and supposing the distance between the centerline of the first signal line and one end of the first black matrix closer to the first pixel electrode is identified by D1(1), the distance between the centerline of the second signal line and one end of the second black matrix closer to the second pixel electrode is identified by D1(2), the distance between the centerline of an adjacent signal line, which is located on the opposite side of the first pixel electrode from the first signal line, and one end of an adjacent black matrix, which is located on the opposite side of the first pixel electrode from the first black matrix, on the side closer to the first pixel electrode, is identified by D2(1), and the distance between the centerline of another adjacent signal line, which is located on the opposite side of the second pixel electrode from the second signal line, and one end of another adjacent black matrix, which is located on the opposite side of the second pixel electrode from the second black matrix, on the side closer to the second pixel electrode, is identified by D2(2), either D1(1)>D1(2) or D2(1)>D2(2) is satisfied.

25. A display device with multiple pixels, the display device comprising:
multiple pixel electrodes, which are provided for the respective pixels; and
multiple signal lines, which are connected to the pixel electrodes via respective switching elements; wherein
the pixel electrodes include a first pixel electrode and a second pixel electrode; and
the signal lines include a first signal line connected to the first pixel electrode and a second signal line connected to the second pixel electrode; and
a first shield electrode, which is arranged under a portion of the first pixel electrode closer to the first signal line, protrudes from the first pixel electrode but a second shield electrode, which is arranged under a portion of the second pixel electrode closer to the second signal line, does not protrude from the second pixel electrode; or
a third shield electrode, arranged under a portion of the first pixel electrode closer to an adjacent signal line, which is located on the opposite side of the first pixel electrode from the first signal line, protrudes from the first pixel electrode but a fourth shield electrode, arranged under a portion of the second pixel electrode closer to another adjacent signal line, which is located on the opposite side of the second pixel electrode from the second signal line, does not protrudes from the second pixel electrode.

26. The display device of claim 25, wherein the multiple pixels include pixels to represent multiple different colors, and wherein according to an XYZ color system, the first pixel electrode has a greater Y value than the second pixel electrode.

27. The display device of claim 25, wherein the aperture ratio of the pixel including the first pixel electrode is substantially equal to that of the pixel including the second pixel electrode.

28. The display device of claim 25, wherein the multiple pixels include pixels to represent multiple different colors, and wherein one repeat unit of those multiple colors includes the first and second pixel electrodes.

29. The display device of claim 28, wherein according to an XYZ color system, the first pixel electrode has a greater Y value than the second pixel electrode.

30. The display device of claim 28, wherein in each said repeat unit of the multiple colors, the aperture ratios of all pixels are substantially equal to each other.

31. The display device of claim 28, wherein each said repeat unit of the multiple colors includes two types of pixel structures, the pixel structures include a first pixel structure associated with the first pixel electrode, and the color represented by the pixel with the first pixel structure is only one of the multiple colors that form the repeat unit.

32. The display device of claim 31, wherein the pixel with the first pixel structure represents one of the multiple colors that has the largest Y value according to the XYZ color system.

33. The display device of claim 31, wherein a first black matrix, having a predetermined width and running in the same direction as the first signal line, is arranged over the first signal line and a second black matrix, having a predetermined width and running in the same direction as the second signal line, is arranged over the second signal line, and supposing the distance between the centerline of the first signal line and one end of the first black matrix closer to the first pixel electrode is identified by D1(1), the distance between the centerline of the second signal line and one end of the second black matrix closer to the second pixel electrode is identified by D1(2), the distance between the centerline of an adjacent signal line, which is located on the opposite side of the first pixel electrode from the first signal line, and one end of an adjacent black matrix, which is located on the opposite side of the first pixel electrode from the first black matrix, on the side closer to the first pixel electrode, is identified by D2(1), and the distance between the centerline of another adjacent signal line, which is located on the opposite side of the second pixel electrode from the second signal line, and one end of another adjacent black matrix, which is located on the opposite side of the second pixel electrode from the second black matrix, on the side closer to the second pixel electrode, is identified by D2(2), either D1(1)>D1(2) or D2(1)>D2(2) is satisfied.

34. The display device of claim 28, wherein each said repeat unit of the multiple colors includes two types of pixel structures, the pixel structures include a first pixel structure associated with the first pixel electrode and a second pixel structure associated with the second pixel electrode, and the colors represented by the pixel with the first pixel structure are two or more of the multiple colors that form the repeat unit.

35. The display device of claim 34, wherein the pixel with the first pixel structure represents one of the multiple colors that has the largest Y value according to the XYZ color system.

36. The display device of claim 34, wherein a first black matrix, having a predetermined width and running in the same direction as the first signal line, is arranged over the first signal line and a second black matrix, having a predetermined width and running in the same direction as the second signal line, is arranged over the second signal line, and supposing the distance between the centerline of the first signal line and one end of the first black matrix closer to the first pixel electrode is identified by D1(1), the distance between the centerline of the second signal line and one end of the second black matrix closer to the second pixel electrode is identified by D1(2), the distance between the centerline of an adjacent signal line, which is located on the opposite side of the first pixel electrode from the first signal line, and one end of an adjacent black matrix, which is located on the opposite side of the first pixel electrode from the first black matrix, on the side closer to the first pixel electrode, is identified by D2(1), and the distance between the centerline of another adjacent signal line, which is located on the opposite side of the second pixel electrode from the second signal line, and one end of another adjacent black matrix, which is located on the opposite side of the second pixel electrode from the second black matrix, on the side closer to the second pixel electrode, is identified by D2(2), either D1(1)>D1(2) or D2(1)>D2(2) is satisfied.

37. A display device with multiple pixels, the display device comprising:
multiple pixel electrodes, which are provided for the respective pixels; and
multiple signal lines, which are connected to the pixel electrodes via respective switching elements; wherein
the pixel electrodes include a first pixel electrode and a second pixel electrode; and
the signal lines include a first signal line connected to the first pixel electrode and a second signal line connected to the second pixel electrode; and
a first shield electrode, which is arranged under a portion of the first pixel electrode closer to the first signal line, is connected to either a scan line or a storage capacitor line but a second shield electrode, which is arranged under a portion of the second pixel electrode closer to the second signal line, is connected to neither a scan line nor a storage capacitor line; or
a third shield electrode, arranged under a portion of the first pixel electrode closer to an adjacent signal line, which is located on the opposite side of the first pixel electrode from the first signal line, is connected to either a scan line or a storage capacitor line but a fourth shield electrode, arranged under a portion of the second pixel electrode closer to another adjacent signal line, which is located on the opposite side of the second pixel electrode from the second signal line, is connected to neither a scan line nor a storage capacitor line.

38. A display device with multiple pixels that are arranged in a matrix pattern, the display device comprising:
multiple pixel electrodes, which are provided for the respective pixels;
multiple signal lines, which are connected to the pixel electrodes via respective switching elements and which run in a column direction of the matrix pattern; wherein the pixel electrodes include a first pixel electrode and a second pixel electrode; and the signal lines include a first signal line connected to the first pixel electrode and a second signal line connected to the second pixel electrode; and
a capacitor formed between the first pixel electrode and the first signal line has smaller capacitance than a capacitor formed between the second pixel electrode and the second signal line; or
a capacitor formed between the first pixel electrode and an adjacent signal line, which is located on the opposite side of the first pixel electrode from the first signal line, has smaller capacitance than a capacitor formed between the second pixel electrode and another adjacent signal line, which is located on the opposite side of the second pixel electrode from the second signal line.

39. A display device with multiple pixels that are arranged in a matrix pattern, the display device comprising:
multiple pixel electrodes, which are provided for the respective pixels;
multiple signal lines, which are connected to the pixel electrodes via respective switching elements and which run in a column direction of the matrix pattern; wherein
the pixel electrodes include a first pixel electrode and a second pixel electrode; and
the signal lines include a first signal line connected to the first pixel electrode and a second signal line connected to the second pixel electrode; and
a value obtained by dividing capacitance between the first pixel electrode and the first signal line by the total capacitance of the first pixel electrode is smaller than a value obtained by dividing capacitance between the second pixel electrode and the second signal line by the total capacitance of the second pixel electrode; or
a value obtained by dividing capacitance between the first pixel electrode and an adjacent signal line, which is located on the opposite side of the first pixel electrode from the first signal line, by the total capacitance of the first pixel electrode is smaller than a value obtained by dividing capacitance between the second pixel electrode and another adjacent signal line, which is located on the opposite side of the second pixel electrode from the second signal line, by the total capacitance of the second pixel electrode.

40. The display device of claim 39, wherein the multiple pixels include pixels to represent multiple different colors, and wherein according to an XYZ color system, the first pixel electrode has a greater Y value than the second pixel electrode.

41. The display device of claim 39, wherein the aperture ratio of the pixel including the first pixel electrode is substantially equal to that of the pixel including the second pixel electrode.

42. The display device of claim 39, wherein the multiple pixels include pixels to represent multiple different colors, and wherein one repeat unit of those multiple colors includes the first and second pixel electrodes.

43. The display device of claim 42, wherein according to an XYZ color system, the first pixel electrode has a greater Y value than the second pixel electrode.

44. The display device of claim 42, wherein in each said repeat unit of the multiple colors, the aperture ratios of all pixels are substantially equal to each other.

45. The display device of claim 42, wherein each said repeat unit of the multiple colors includes n types of pixel structures, the pixel structures include an $m^{th}$ pixel structure, where m=1 to n, associated with an $m^{th}$ pixel electrode, the pixel electrodes include the $m^{th}$ pixel electrode included in the $m^{th}$ pixel structure, the signal lines include an $m^{th}$ signal line connected to the $m^{th}$ pixel electrode, supposing a capacitor formed between the $m^{th}$ pixel electrode and the $m^{th}$ signal line has capacitance Csd1(m) and a capacitor formed between the mth pixel electrode and an adjacent signal line, which is located on the opposite side of the mth pixel electrode from the mth signal line, has capacitance Csd2(m), either $Csd1(1)<Csd1(2)=Csd1(3)=\ldots=Csd1(n)$ or $Csd2(1)<Csd2(2)=Csd2(3)=\ldots=Csd2(n)$ is satisfied.

46. The display device of claim 45, wherein the pixel with the first pixel structure represents one of the multiple colors that has the largest Y value according to the XYZ color system.

47. The display device of claim 45, wherein an $m^{th}$ black matrix, where m=1 to n, having a predetermined width and running in the same direction as the $m^{th}$ signal line, is arranged over the $m^{th}$ signal line and supposing the distance between the centerline of the $m^{th}$ signal line and one end of the $m^{th}$ black matrix closer to the $m^{th}$ pixel electrode is identified by D1(m), and the distance between the centerline of an adjacent signal line, which is located on the opposite side of the $m^{th}$ pixel electrode from the $m^{th}$ signal line, and one end of an adjacent black matrix, which is located on the opposite side of the $m^{th}$ pixel electrode from the $m^{th}$ black matrix, on the side closer to the $m^{th}$ pixel electrode, is identified by D2(m), either $D1(1)>D1(2)=D1(3)=\ldots D1(n)$ or $D2(1)>D2(2)=D2(3)=\ldots D2(n)$ is satisfied.

48. The display device of claim 42, wherein each said repeat unit of the multiple colors includes n types of pixel structures, the pixel structures include an $m^{th}$ pixel structure, where m=1 to n, associated with an $m^{th}$ pixel electrode, the pixel electrodes include the $m^{th}$ pixel electrode included in the $m^{th}$ pixel structure, the signal lines include an $m^{th}$ signal line connected to the $m^{th}$ pixel electrode, and supposing a capacitor formed between the $m^{th}$ pixel electrode and the $m^{th}$ signal line has capacitance Csd1(m) and a capacitor formed between the $m^{th}$ pixel electrode and an adjacent signal line, which is located on the opposite side of the $m^{th}$ pixel electrode from the $m^{th}$ signal line, has capacitance Csd2(m), either $Csd1(1)\leq Csd1(2)\leq Csd1(3)\leq \ldots \leq Csd1(n)$ or $Csd2(1)\leq Csd2(2)\leq Csd2(3)\leq \ldots \leq Csd2(n)$ is satisfied.

49. The display device of claim 48, wherein supposing the Y value of a color represented by a pixel with the $m^{th}$ pixel structure (where m=1 to n) is identified by Y(m) according to an XYZ color system, $Y(1)>Y(2)>Y(3)>\ldots >Y(n)$ is satisfied.

50. The display device of claim 48, wherein an $m^{th}$ black matrix, where m=1 to n, having a predetermined width and running in the same direction as the $m^{th}$ signal line, is arranged over the $m^{th}$ signal line, and supposing the distance between the centerline of the $m^{th}$ signal line and one end of the $m^{th}$ black matrix closer to the $m^{th}$ pixel electrode is identified by D1(m), and the distance between the centerline of an adjacent signal line, which is located on the opposite side of the $m^{th}$ pixel electrode from the $m^{th}$ signal line, and one end of an adjacent black matrix, which is located on the opposite side of the $m^{th}$ pixel electrode from the $m^{th}$ black matrix, on the side closer to the $m^{th}$ pixel electrode, is identified by D2(m), either $D1(1)\geq D1(2)\geq D1(3)\geq \ldots \geq D1(n)$ or $D2(1)\geq D2(2)\geq D2(3)\geq \ldots D2(n)$ is satisfied.

51. A color filter substrate for a display device that has a display area defined by multiple pixels, wherein the color filter substrate comprises:

multiple pixel regions, which are provided for the respective pixels; and multiple black matrices, which are arranged on boundaries between the pixel regions; wherein pixel regions include a pixel region to represent multiple different colors;

in each repeat unit of the multiple different colors, the black matrices include a first black matrix and a second black matrix; and the first black matrix has a greater width than the second black matrix.

52. The color filter substrate of claim 51, wherein in each said repeat unit of the multiple different colors, a pixel region representing one of the multiple different colors that has the highest luminance is located adjacent to the first black matrix.

53. The color filter substrate of claim 51, wherein in each said repeat unit of the multiple different colors, the aperture ratios of all of the pixel regions are substantially equal to each other.

* * * * *